(12) United States Patent
Kobayashi

(10) Patent No.: US 11,960,077 B2
(45) Date of Patent: Apr. 16, 2024

(54) OPTICAL APPARATUS

(71) Applicant: CANON KABUSHIKI KAISHA, Tokyo (JP)

(72) Inventor: Yuma Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 17/537,182

(22) Filed: Nov. 29, 2021

(65) Prior Publication Data
US 2022/0171184 A1 Jun. 2, 2022

(30) Foreign Application Priority Data
Dec. 1, 2020 (JP) .................. 2020-199390

(51) Int. Cl.
*G02B 5/23* (2006.01)
*G02B 26/08* (2006.01)
*G02B 27/00* (2006.01)

(52) U.S. Cl.
CPC ..... *G02B 27/0068* (2013.01); *G02B 26/0875* (2013.01)

(58) Field of Classification Search
None
See application file for complete search history.

(56) References Cited

U.S. PATENT DOCUMENTS

2001/0017985 A1* 8/2001 Tsuboi ................ G02B 26/005
348/E5.04

FOREIGN PATENT DOCUMENTS

JP 2017198941 A 11/2017

* cited by examiner

*Primary Examiner* — Joseph P Martinez
(74) *Attorney, Agent, or Firm* — CANON U.S.A., INC. IP Division

(57) ABSTRACT

An apparatus includes a system having an element capable of changing a radius at which a normalized transmittance becomes 0.25 by 20% or more of a maximum effective radius and a stop capable of changing an aperture radius, and a control unit for controlling a transmittance distribution of the element and the aperture radius.

19 Claims, 12 Drawing Sheets

OPTICAL APPARATUS

BACKGROUND

Field of the Disclosure

The aspect of the embodiments relates to an optical apparatus.

Description of the Related Art

Conventionally, in an image formed by an optical apparatus, there is a case in which it is required to include a blur with a smooth outline, while there is also a case in which it is required to include a blur with a clear outline.

Japanese Patent Application Laid-Open No. 2017-198941 discloses an optical apparatus capable of smoothing or clarifying the outline of the blur by providing an optical element capable of switching a transmittance distribution reversibly.

It is required that a sharpness of the outline of the blur can be sufficiently adjusted even when an aperture diameter of a stop is largely changed.

However, the optical apparatus disclosed in Japanese Patent Application Laid-Open No. 2017-198941 is insufficient to meet the above-described requirement since the sharpness of the outline of the blur can be sufficiently adjusted in the vicinity of a maximum aperture of the stop.

SUMMARY OF THE DISCLOSURE

An apparatus includes a system having an element capable of changing a radius at which a normalized transmittance becomes 0.25 by 20% or more of a maximum effective radius and a stop capable of changing an aperture radius, and a control unit for controlling a transmittance distribution of the element and the aperture radius.

Further features of the disclosure will become apparent from the following description of exemplary embodiments with reference to the attached drawings.

DESCRIPTION OF THE EMBODIMENTS

The optical apparatus according to the aspect of the embodiments will be described in detail below with reference to the accompanying drawings. In order to facilitate understanding of the aspect of the embodiments, the following drawings may be drawn in a scale different from the actual scale.

In various optical systems including photographic and video lenses, not only characteristics of the imaging plane but also an image quality of an outfocus portion, namely a quality of a blur may be emphasized.

In general, a smooth blur in which an outline is not clear so as to fit in is desired in some cases, and a blur with a clear outline is desired in other cases.

As a method for changing the outline of the blur, for example, there is known a method for inserting an apodization filter in which a transmittance decreases as a distance from an optical axis increases into an optical system.

By this method, a transmittance distribution of the apodization filter is superposed on the blurred image, and a smooth blur in which the outline fits in can be realized.

However, when the apodization filter is inserted, the outline of the blur already becomes smooth in the vicinity of a maximum aperture of a stop, so that it becomes difficult to clarify the outline of the blur on demand.

Further, when the apodization filter is inserted, an amount of a transmitted light in the optical system decreases, so that a demerit due to the insertion of the apodization filter becomes larger in a photographing scene in which the blur is hardly generated in a screen.

For this reason, there is also known a method of switching on and off an apodization effect by using an optical element capable of controlling the transmittance distribution reversibly, namely adjusting a clarity of the outline of the blur on demand.

On the other hand, it is required that the clarity of the outline of the blur can be sufficiently adjusted even when an aperture diameter of the stop is largely changed. However, no optical apparatus capable of meeting such a demand is known.

Accordingly, it is an object of the aspect of the embodiments to provide an optical apparatus capable of sufficiently adjusting the clarity of the outline of the blur even when the aperture diameter of the stop is largely changed.

Figure 1:
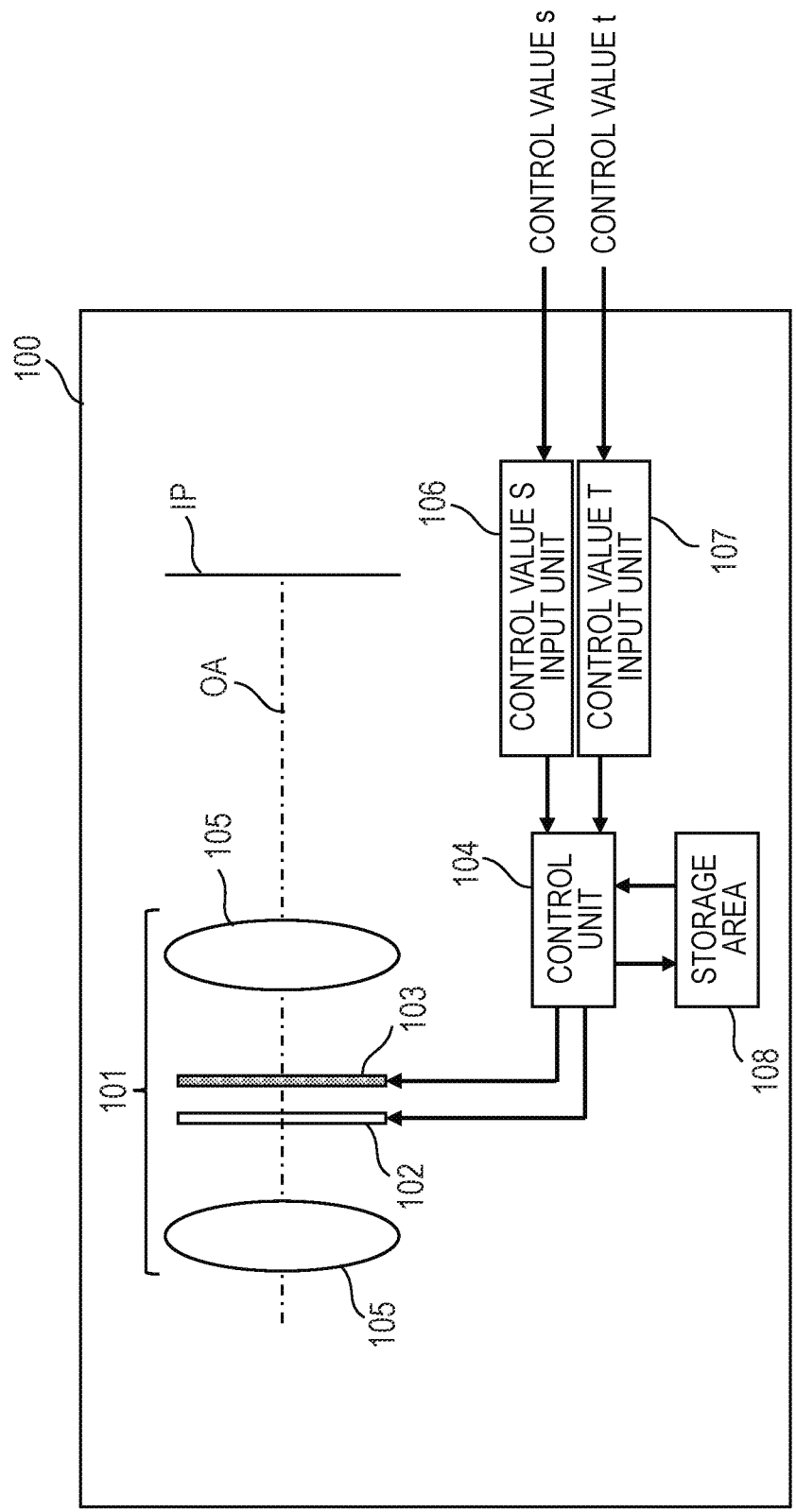
FIG. 1 is a schematic view of an image pickup apparatus including an optical apparatus according to the aspect of the embodiments.

FIG. 1 shows a schematic view of an image pickup apparatus 100 including an optical apparatus according to the aspect of the embodiments.

As shown in FIG. 1, the image pickup apparatus 100 includes an imaging optical system 101, a control unit 104, a control value s input unit 106, a control value t input unit 107, a storage area 108 and an imaging plane IP.

The imaging optical system 101 includes a mechanical stop 102, a distribution variable element 103 and a lens 105.

As the imaging plane IP, an image can be recorded by arranging a photoelectric conversion element such as a CMOS (Complementally Metal Oxide Semiconductor) or a CCD (Charge Coupled Device) as a solid-state image pickup element, an organic thin film image pickup element or a photosensitive film.

The optical apparatus according to the aspect of the embodiments includes the imaging optical system 101, the control unit 104, the control value s input unit 106, the control value t input unit 107 and the storage area 108.

Then, the image pickup apparatus 100 includes the optical apparatus according to the aspect of the embodiments and an image pickup element arranged on the imaging plane IP.

In the image pickup apparatus 100, one lens 105 is arranged on each of an object side of the mechanical stop 102 and an image side of the distribution variable element 103. However, the aspect of the embodiments is not limited thereto, and one of the lenses 105 may be arranged or a lens 105 may be arranged between the mechanical stop 102 and the distribution variable element 103.

A curved mirror, a diffractive optical element or the like may be used instead of the lens 105, and a plurality or all of the lenses, the curved mirror and the diffractive optical element may be used in combination.

The imaging optical system 101 may include a flat mirror, and the optical axis OA may be bent by the flat mirror.

The imaging optical system 101 and the imaging plane IP may be provided in the same housing or they may be provided in different housings so that they can be separated from each other as a lens interchangeable camera to which an interchangeable lens is attached.

The optical elements included in the imaging optical system 101 may be separable from each other, or a part of optical elements included in the imaging optical system 101 may be separable from the imaging plane IP.

If the image pickup apparatus 100 can be separated into a plurality of portions, the control unit 104 may be included in a portion where the imaging optical system 101 is provided or may be included in a portion where the imaging plane IP is provided.

The control unit 104 may be separated such that functions of the control unit 104 are shared between the portion where the imaging optical system 101 is provided and the portion where the imaging plane IP is provided.

The storage area 108 may be included in the portion where the imaging optical system 101 is provided or may be included in the portion where the imaging plane IP is provided.

An SD card or the like may be used as the storage area 108 and may be removed from the image pickup apparatus 100 or replaced in the image pickup apparatus 100.

The imaging optical system 101 and the imaging plane IP may be provided in the same housing, and the control unit 104 may be separable from the housing.

The control value s input unit 106 and the control value t input unit 107 may be included in the housing where the imaging optical system 101 is provided, may be included in the housing where the imaging plane IP is provided or may be included separately in the housings.

The control value s input unit 106 and the control value t input unit 107 may be inputted via an input unit or the like included in the housing where the imaging optical system 101 is provided or the housing where the imaging plane IP is provided, by wireless or wired means.

The control value s input unit 106 and the control value t input unit 107 are not needed to be physically different from each other, and may be configured as the same input unit capable of electrically switching between an input of a control value s and the input of a control value t.

Examples of the control value s input unit 106 and the control value t input unit 107 include a device consisting of a ring provided in a lens barrel portion for holding the imaging optical system 101 and a unit for detecting a rotation of the ring, and a device consisting of a dial and a unit for detecting a rotation of the dial.

Another example of them include a display device having a contact detection function, a button device for detecting a press, a device consisting of a lever and a unit for detecting an inclination of the lever, and a selector switch device consisting of a knob and a unit for detecting a rotation of the knob.

Next, features of the image pickup apparatus 100 will be described.

First, with respect to the mechanical stop 102, an aperture radius $r_{sp}$ can be changed within a region through which an effective imaging light flux can pass when incorporated into the image pickup apparatus 100.

When a maximum value and a minimum value of the aperture radius $r_{sp}$ are represented by $r_{spmax}$ and $r_{spmin}$, respectively, in one embodiment, the image pickup apparatus 100 uses the mechanical stop 102 capable of changing the aperture radius $r_{sp}$ within a range of the following inequality (1).

$$0.000 \leq r_{spmin}/r_{spmax} \leq 0.500 \tag{1}$$

If the range in which the aperture radius $r_{sp}$ can be changed so as to exceed an upper limit value of the inequality (1) becomes narrow, it becomes difficult to realize a wide range of an F-value.

Note that it is not necessary to continuously take all values in the range of the inequality (1) for the aperture radius $r_{sp}$, and a control may be performed such that the value of the aperture radius $r_{sp}$ can be taken discretely in units of 0.1 $r_{spmax}$ or 0.05 $r_{spmax}$, for example.

In the case of discretely controlling the aperture radius $r_{sp}$ as described above, in one embodiment, a unit in control is fine such that the unit can be controlled with a fineness of at least 0.25$r_{spmax}$ or less. Thereby, the F-value can be controlled in sufficiently fine steps.

Further, the unit in control does not have to be a constant value, and the unit may be changed according to the value of the aperture radius $r_{sp}$.

In the image pickup apparatus 100, in another embodiment, the following inequalities (1a) to (1d) are satisfied in this order:

$$0.000 \leq r_{spmin}/r_{spmax} \leq 0.250 \tag{1a}$$

$$0.000 \leq r_{spmin}/r_{spmax} \leq 0.100 \tag{1b}$$

$$0.000 \leq r_{spmin}/r_{spmax} \leq 0.010 \quad (1c)$$

$$0.000 \leq r_{spmin}/r_{spmax} \leq 0.004 \quad (1d).$$

The aperture radius $r_{sp}$ of the mechanical stop 102 is defined as a radius at which a transmittance normalized by the transmittance on the optical axis in the mechanical stop 102 in a predetermined state becomes 0.5.

In the case where the mechanical stop 102 is formed of a light shielding member having the transmittance of 0.01 or less, a value obtained by averaging the distance from the optical axis to the light shielding member along a circumferential direction is defined as the aperture radius $r_{sp}$.

Further, a radius of an exit pupil (hereinafter referred to as an exit pupil radius) with respect to an axial light flux of the imaging optical system 101 defined by the aperture radius $r_{sp}$ of the mechanical stop 102 is represented by $r_{pa}$, and a maximum value of the exit pupil radius $r_{pa}$ is represented by $r_{pamax}$.

As the mechanical stop 102, for example, an iris stop whose aperture diameter can be changed by moving at least one stop blade, a waterhouse stop in which members having different aperture diameters are replaced or the like, can be used.

When the iris stop is used as the mechanical stop 102, in one embodiment, the number of the stop blades is five or more.

With such a configuration, a shape of a blur can be kept so as to be close to a regular circle in a wide range of the F-value.

In addition, a physical property stop capable of controlling the transmittance for each concentric circular region may be used as the mechanical stop 102, but, in this case, in one embodiment, an apodization effect caused by the physical property stop is small. When a large apodization effect is generated by the physical property stop, it becomes difficult to realize a clear outline of the blur.

In the image pickup apparatus 100, as the distribution variable element 103, one which can change a radius $r_{v025}$ by 20% or more of a maximum effective radius is used when the radius at which an internally normalized transmittance $T_v$ becomes 0.25 is represented by $r_{v025}$. Thereby, even when the mechanical stop 102 is narrowed, the outline of the blur can be sufficiently adjusted.

When a variable range of the radius $r_{v025}$ becomes narrower than the above-described range, there are very few cases where the outline of the blur can be freely adjusted.

The maximum effective radius as described above corresponds to a distance from a position farthest from the optical axis to the optical axis among regions through which an effective imaging light flux can pass in the distribution variable element 103, and a radius of the distribution variable element 103 normalized with this distance as 1 is represented by a normalized radius $r_v$ of the distribution variable element 103.

The effective imaging light flux means a light flux excluding stray light and a light flux forming an image outside a region where an image is recorded on an imaging plane IP.

The internally normalized transmittance $T_v$ means a normalized transmittance normalized by a maximum value in a predetermined transmittance distribution of one distribution variable element 103. The transmittance at a predetermined radius is, unless otherwise specified, defined as an average value along a circumferential direction of the transmittance at the predetermined radius in a plane perpendicular to the optical axis around the optical axis.

As the transmittance, an average value of the transmittance (a visible light transmittance) at wavelengths between 400 nm and 700 nm, between 420 nm and 650 nm or between 420 nm and 850 nm may be used, and a representative value at wavelengths of 550 nm or 587.6 nm may be used. In the following description, the transmittance is calculated as a representative value at a wavelength of 550 nm.

When the imaging optical system 101 has a plurality of distribution variable elements 103, it is sufficient that the radius $r_{v025}$ can be changed by 20% or more of the maximum effective radius in at least one distribution variable element 103.

Figure 2:
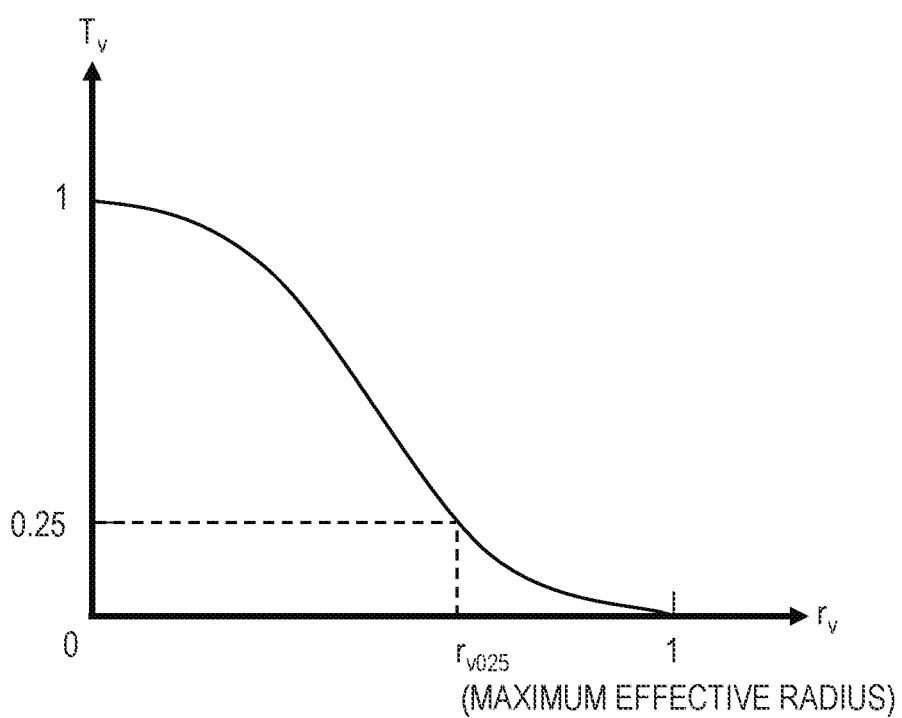
FIG. 2 is a graph showing a relationship between a radius $r_{v025}$ and a maximum effective radius.

FIG. 2 shows a relationship between the radius $r_{v025}$ defined above and the maximum effective radius ($r_v$=1).

In the distribution variable element 103, when the variable range of the radius $r_{v025}$ is 30% or more of the maximum effective radius, a degree of freedom of an adjustment for the outline of the blur can be further increased, and when the variable range is 40% or more of the maximum effective radius, the degree of freedom of the adjustment for the outline of the blur can be still further increased.

When the distribution variable element 103 is formed of a curved surface, a distribution of the internally normalized transmittance $T_v$ of the distribution variable element 103 can be evaluated by a projection onto a plane perpendicular to the optical axis.

In the image pickup apparatus 100, in one embodiment, a transmittance distribution of an exit pupil of an axial light flux is set so as to satisfy the following inequality (2) when the transmittance distribution is given to the axial light flux by using the distribution variable element 103, especially when $r_p$ is any of 1 and 0.7:

$$-6.0 \leq D'(r_p) \leq 1.0 \quad (2).$$

Here, $r_p$ represents a normalized radius (hereinafter referred to as a normalized exit pupil radius) obtained by normalizing an exit pupil radius $r_{pa}$ with a maximum value $r_{pamax}$, and takes a value between 0 and 1. When a relationship between an entire system normalized transmittance T and the normalized exit pupil radius $r_p$ is represented by a function $D(r_p)$ as in the following expression (3), a derivative of the function $D(r_p)$ with respect to the normalized exit pupil radius $r_p$ is represented by $D'(r_p)$:

$$T = D(r_p) \quad (3).$$

The differential $D'(r_{px})$ at $r_p = r_{px}$ of the function $D(r_p)$ is defined as the following expressions (4) and (5):

(a) when $0 \leq r_{px} \leq 0.99$ $$D'(r_{px}) = (D(r_{px}+0.01) - D(r_p)) \times 100 \quad (4)$$

(b) when $r_{px} > 0.99$ $$D'(r_{px}) = (D(r_{px}) - D(r_{px}-0.01)) \times 100 \quad (5).$$

The entire system normalized transmittance T is a transmittance (a normalized transmittance) at a predetermined position normalized by the transmittance on the optical axis at the exit pupil with respect to the axial light flux of the imaging optical system 101.

If the value exceeds the upper limit value in the inequality (2), it becomes difficult to achieve a transmittance distribution in which the transmittance decreases as a distance from a center increases, so that a part of the blur becomes unnaturally bright or the outline of the blur is excessively emphasized, which is not preferable.

On the other hand, when the value falls below the lower limit value in the inequality (2), the transmittance does not change gently, so that it becomes difficult to sufficiently smooth the outline of the blur.

Further, in the image pickup apparatus 100, in one embodiment, the following inequality (2a) is satisfied:

$$-5.0 \leq D'(r_p) \leq 0.0 \quad (2a).$$

When a transmittance distribution satisfying the following expression (6) is given to the axial light flux by using the distribution variable element 103, especially when the normalized exit pupil radius $r_p$ is any of 1 and 0.7, the transmittance distribution of the exit pupil of the axial light flux is set so as to satisfy the following inequality (7):

$$D(1) < 0.1 \quad (6)$$

$$-0.80 \leq \text{ave}(D'(r_p))[0.9,1] \leq 0.00 \quad (7).$$

Here, ave(f (x))[a, b] means an average value of the function f(x) in an interval represented by the following expression (8):

$$a \leq x \leq b \quad (8).$$

When the value exceeds the upper limit value in the inequality (7), the transmittance increases at the end of the exit pupil and the outline of the blur is unnaturally emphasized, which is not preferable.

On the other hand, when the value falls below the lower limit value in the inequality (7), the transmittance rapidly changes at the end of the exit pupil and the outline of the blur is not sufficiently smooth, which is not preferable.

Further, in the image pickup apparatus 100, in one embodiment, the following inequality (7a) is satisfied:

$$-0.75 \leq \text{ave}(D'(r_p))[0.9,1] \leq 0.00 \quad (7a).$$

In the image pickup apparatus 100, in one embodiment, the transmittance distribution of the exit pupil of the axial light flux so as to satisfy the following inequality (9):

$$-1.00 \leq \text{ave}(D'(r_p))[0,0.2] \leq 0.10 \quad (9).$$

By satisfying the inequality (9), it is possible to suppress a decrease in a light amount accompanied by a provision of a transmittance distribution.

That is, when the value exceeds the upper limit value in the inequality (9), it becomes difficult to achieve a transmittance distribution in which the transmittance decreases as a distance from a center increases, so that a part of the blur becomes unnaturally bright or the center of the blur becomes unnaturally dark, which is not preferable.

On the other hand, when the value falls below the lower limit value in the inequality (9), a decrease in transmittance in a region slightly away from the center becomes large, so that a decrease in a light amount of an imaging light flux becomes large, which is not preferable.

Further, in the image pickup apparatus 100, in one embodiment, the following inequality (9a) is satisfied:

$$-0.70 \leq \text{ave}(D'(r_p))[0,0.2] \leq 0.10 \quad (9a).$$

Furthermore, in the image pickup apparatus 100, in another embodiment, the following inequality (9b) is satisfied:

$$-0.55 \leq \text{ave}(D'(r_p))[0,0.2] \leq 0.10 \quad (9b).$$

In the image pickup apparatus 100, when the aperture radius $r_{sp}$ of the mechanical stop 102 is the maximum value $r_{spmax}$, regarding a transmittance on the optical axis of the exit pupil when a transmittance distribution of the distribution variable element 103 is changed, when a maximum value represents $T_{max}$, a value when the distribution variable element 103 has a predetermined transmittance distribution represents $T_{ax}$, and the number of the distribution variable elements 103 included in the imaging optical system 101 represents p, in one embodiment, the following inequality (10) is always satisfied:

$$0.3^p < T_{ax}/T_{max} < 1.0 \quad (10).$$

In other words, in the image pickup apparatus 100, when the aperture radius $r_{sp}$ of the mechanical stop 102 is the maximum radius $r_{spmax}$, the maximum and minimum values of the transmittance on the optical axis of the exit pupil when the transmittance distribution of the distribution variable element 103 is changed are represented by $T_{max}$ and $T_{min}$, respectively, and the number of the distribution variable elements 103 included in the imaging optical system 101 is represented by p, in one embodiment, the following inequality (10)' is satisfied:

$$0.3^p < T_{min}/T_{max} < 1.0 \quad (10)'.$$

Based on the definition, the ratio does not exceed the upper limit value in the inequality (10). On the other hand, when the ratio falls below the lower limit value in the inequality (10), a change in a light amount, specifically a decrease in the light amount becomes large when the transmittance distribution of the distribution variable element 103 is changed, which is not preferable.

Further, in the image pickup apparatus 100, in another embodiment, the following inequality (10a) is satisfied:

$$0.4^p < T_{min}/T_{max} < 1.0 \quad (10a).$$

As a transmittance distribution of the distribution variable element 103, a distribution represented by the following expression (11) can be used, for example:

$$DV(r_v) = \left[\cos\left(\frac{\pi}{B}r_v\right)\right]^A. \quad (11)$$

Here, $DV(r_v)$ is a normalized transmittance at a predetermined normalized radius G normalized by a maximum radius (a maximum effective radius) of a region through which an effective imaging light flux can pass in the distribution variable element 103, that is the internally normalized transmittance $T_v$. Further, A and B are coefficients that are positive real numbers defined in a range represented by the following expression (12), respectively:

$$1.0 < A, 2.0 \leq B \quad (12).$$

Figure 3A:
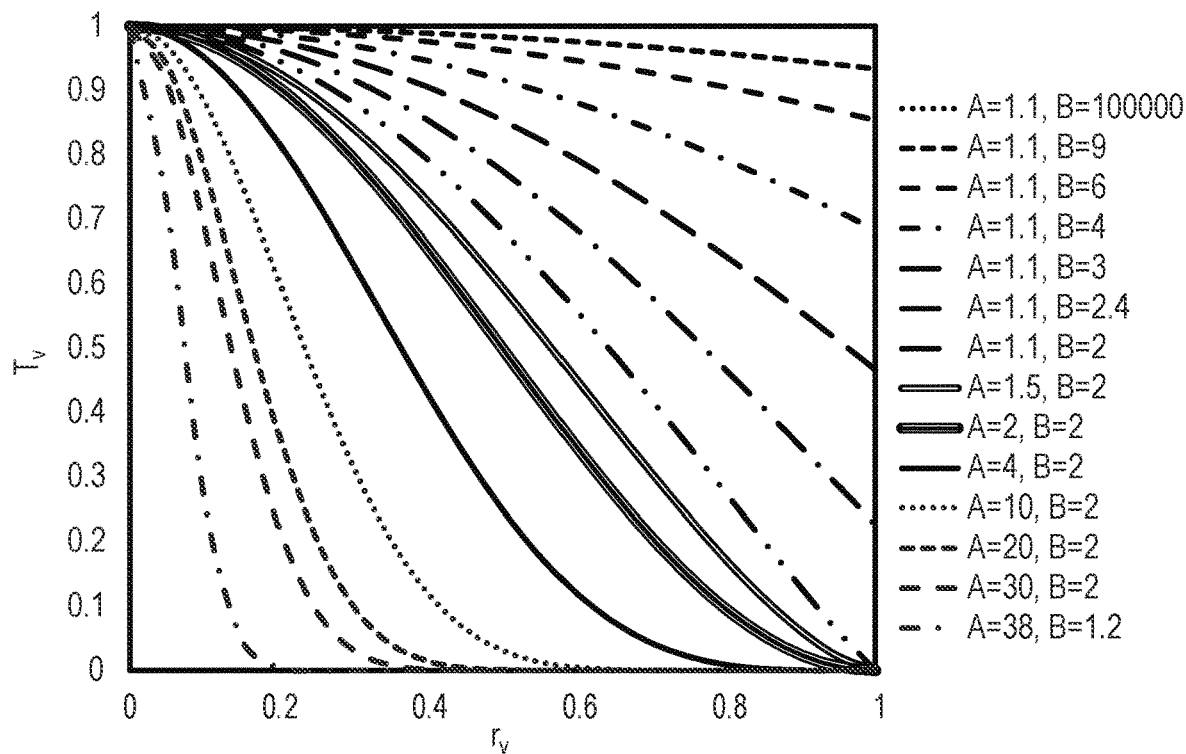
FIG. 3A is a graph plotting distributions of an internally normalized transmittance by various values of A and B.

FIG. 3A shows a graph plotting $DV(r_v)$ (=$T_v$) represented by the expression (11) at various values of A and B.

Here, it is considered the imaging optical system 101 including one distribution variable element 103 and one mechanical stop 102, in which a distance $d_1$ in the optical axis direction between the distribution variable element 103 and intersection of a center of an outermost off-axis light flux and the optical axis in a meridional cross section and a distance $d_2$ in the optical axis direction between the distribution variable element 103 and the mechanical stop 102 are 0, respectively.

In such imaging optical system 101, assuming that there is no absorption or reflection of light by an aberration of a pupil and other factors, and no reflection by the distribution variable element 103 or the mechanical stop 102, a transmittance distribution formed by the distribution variable element 103 and the mechanical stop 102 and a transmittance distribution of an exit pupil with respect to an axial light flux coincide with each other.

In the case that the transmittance distributions coincide with each other as descried above, when the aperture radius $r_{sp}$ of the mechanical stop 102 is the maximum value $r_{spmax}$, for example, the coefficients A and B may be set such that the transmittance distribution of the distribution variable element 103 can be changed within a range represented by the following expression (13) according to the control value v:

$$1.1 \leq A \leq 4.0, 2.0 \leq B \quad (13).$$

Further, when the aperture radius $r_{sp}$ is $0.7r_{spmax}$, the coefficients A and B may be set so that the transmittance distribution of the distribution variable element 103 can be changed within a range represented by the following expression (14):

$$1.1 \leq A \leq 8.5, 2.0 \leq B \quad (14).$$

Furthermore, when the aperture radius $r_{sp}$ is $0.5r_{spmax}$, the coefficients A and B may be set so that the transmittance distribution of the distribution variable element 103 can be changed within a range represented by the following expression (15):

$$1.1 \leq A \leq 17.0, 2.0 \leq B \quad (15).$$

In the distribution variable element 103, when a transmittance distribution is given, the transmittance on the optical axis may also decrease. For example, when the ratio $T_{ax}/T_{max}$ between the transmittance of the exit pupil on the optical axis and the maximum transmittance in the distribution variable element 103 whose transmittance distribution is represented by the expression (11) is represented by the following expression (16), a sufficient light amount can be obtained:

$$T_{ax}/T_{max} = 0.5 + 0.55/A \quad (16).$$

As the transmittance distribution of the distribution variable element 103, a distribution represented by the following expression (17) can be used:

$$DV(r_v) = \frac{\exp(-\alpha\beta) + 1}{\exp\{\beta(r_v - \alpha)\} + 1}. \quad (17)$$

Here, exp(x) means the Napier number to the x-th power (i.e., $e^x$), and $\alpha$ and $\beta$ are coefficients defined in a range represented by the following expression (18), respectively:

$$0 \leq \alpha \leq 1, 0 \leq \beta \quad (18).$$

Figure 3B:
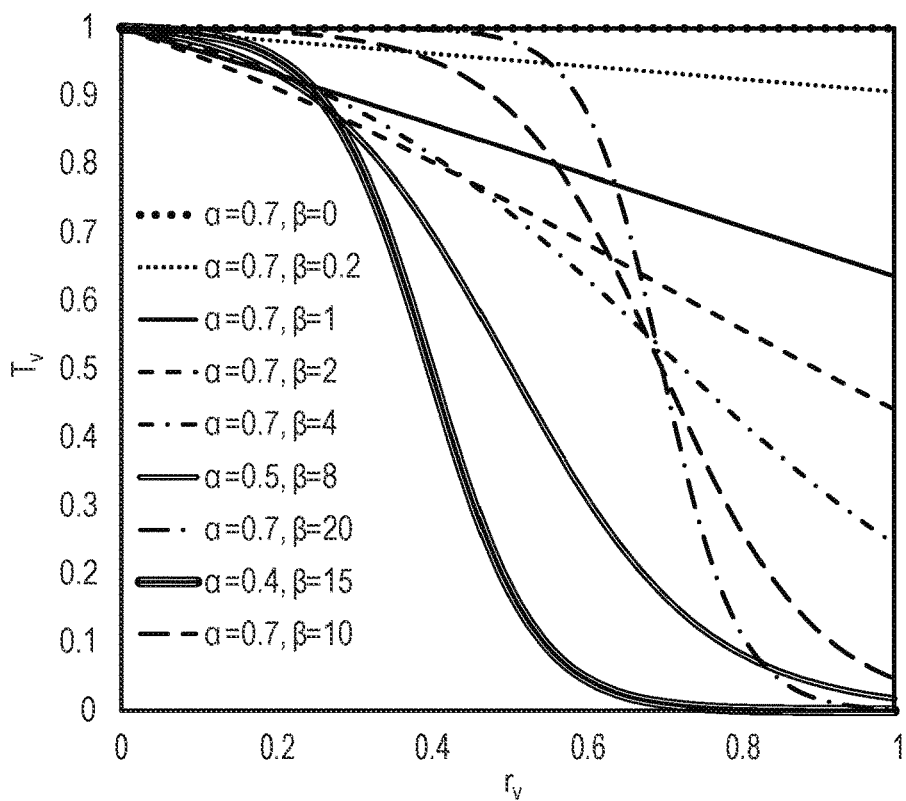
FIG. 3B is a graph plotting the distribution of the internally normalized transmittance by various values of $\alpha$ and $\beta$.

FIG. 3B shows a graph plotting $DV(r_v)$ (=$T_v$) represented by the expression (17) at various values of $\alpha$ and $\beta$.

In the case that a transmittance distribution formed by the distribution variable element 103 and the mechanical stop 102 and a transmittance distribution of an exit pupil with respect to an axial light flux coincide with each other, when the aperture radius $r_{sp}$ of the mechanical stop 102 is the maximum value $r_{spmax}$, for example, the coefficients $\alpha$ and $\beta$ may be set such that the transmittance distribution of the distribution variable element 103 can be changed within a range represented by the following expression (19) according to the control value v:

$$0.30 \leq \alpha \leq 0.70, 0 \leq \beta \leq 20 \quad (19).$$

Further, when the aperture radius $r_{sp}$ is $0.7r_{spmax}$, the coefficients $\alpha$ and $\beta$ may be set so that the transmittance distribution of the distribution variable element 103 can be changed within a range represented by the following expression (20):

$$0.26 \leq \alpha \leq 0.55, 0 \leq \beta \leq 30 \quad (20).$$

For example, when the ratio $T_{ax}/T_{max}$ between the transmittance of the exit pupil on the optical axis and the maximum transmittance in the distribution variable element 103 whose transmittance distribution is represented by the expression (17) is represented by the following expression (21), a sufficient light amount can be obtained:

$$T_{ax}/T_{max} = 0.3 + \alpha \times \exp(-0.1\beta) \quad (21).$$

In the distribution variable element 103, in one embodiment, the values of the spectral transmittance for each wavelength in the wavelength range between 430 nm and 650 nm substantially coincide with each other, even when the transmittance distribution is changed.

Specifically, the ratio between the transmittances in two predetermined wavelengths in the wavelength range between 430 nm and 650 nm at a predetermined point within an effective diameter is set between 0.75 and 1.25, thereby it is possible to suppress an occurrence of coloration in a part of the blur.

When the ratio exceeds the above-described upper limit value or falls below the above-described lower limit value, the coloration in a part or the whole of the blur becomes conspicuous.

In the image pickup apparatus 100, in one embodiment, the above-described ratio is set between 0.80 and 1.20, and in another embodiment, the above-described ratio is set between 0.85 and 1.15.

In addition, in one embodiment, a change in a color tone on an entire screen can be reduced when an intelligibility of the outline of the blur is changed by satisfying the following inequality (22) in the distribution variable element 103:

$$(a_1 - a_2)^2 + (b_1 - b_2)^2 < 16 \quad (22).$$

Here, a chromaticity in the L*a*b* space defined by the C1E1976 at an imaging position of an axial light flux for predetermined two transmittance distributions is represented by ($L_1$, $a_1$, $b_1$) and ($L_2$, $a_2$, $b_2$), respectively, when the transmittance distribution of the distribution variable element 103 is changed.

Further, in the image pickup apparatus 100, in another embodiment, the following inequality (22a) is satisfied:

$$(a_1 - a_2)^2 + (b_1 - b_2)^2 < 8 \quad (22a).$$

In the image pickup apparatus 100, an electrochromic element, a photochromic element, a liquid crystal element or the like can be used as the distribution variable element 103.

The electrochromic element is an element capable of reversibly switching between a colorization and a decolorization by utilizing an electrochromic phenomenon in which a material is colorized or decolorized by a change in a light transmittance of the material accompanied by a reversible electrochemical reaction occurring when a voltage is applied.

The photochromic element is an element capable of reversibly switching between a colorization and a decolorization by utilizing a photochromic phenomenon in which a material is colorized or decolorized by a change in a light transmittance of the material accompanied by a reversible chemical reaction by a light irradiation.

The liquid crystal element is an element which uses a liquid crystal material in which an orientation state of molecules is reversibly changed by applying a voltage and can switch a transmission and a non-transmission of light by sandwiching a liquid crystal layer between polarizing plates.

Note that a desired transmittance distribution can also be obtained by driving the above-described elements with dividing a region (an effective diameter) through which an effective imaging light flux can pass into fine subregions.

Figure 4:
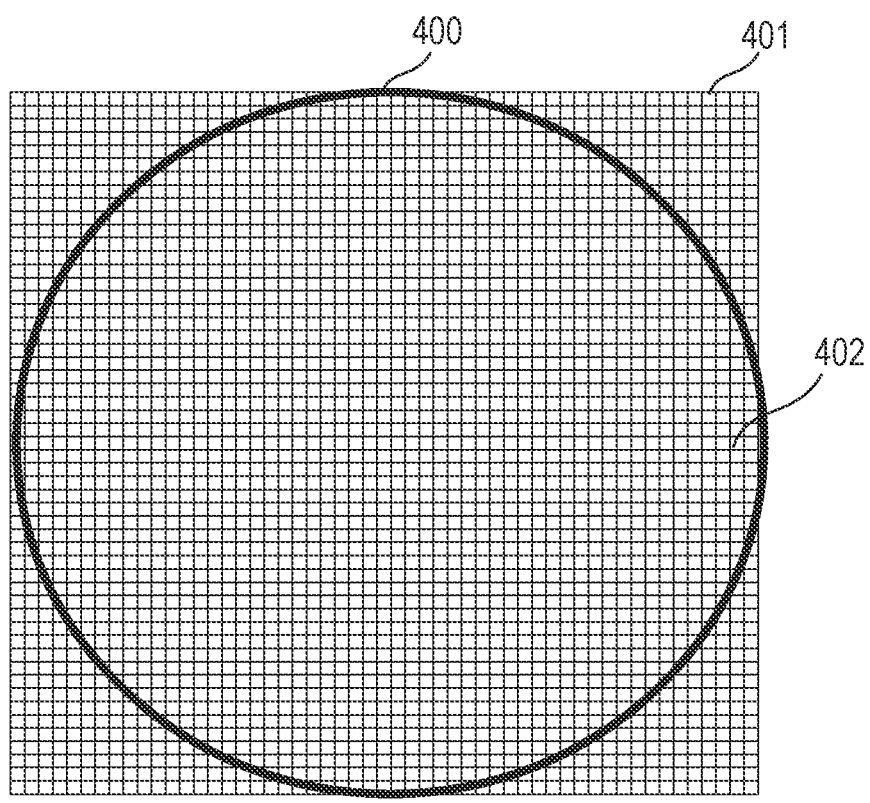
FIG. 4 is a schematic view of a distribution variable element with subregions.

FIG. 4 shows a schematic diagram of an element with such subregions.

As shown in FIG. 4, a region 400 through which an effective imaging light flux can pass in the element is divided into a plurality of subregions 402, and electrodes are provided in each of the subregions 402, thereby a boundary 401 of electrode is formed between the adjacent subregions 402.

In such element, in one embodiment, the axial light flux passes between the boundaries 401 of electrode when the transmittance distribution of the distribution variable element 103 and the aperture radius $r_{sp}$ of the mechanical stop 102 are set so as to maximize the transmittance of the exit pupil for the axial light flux.

However, when the region 400 through which the effective imaging light flux can pass is divided and driven as the element shown in FIG. 4, the boundary 401 of electrode is formed in the region 400, thereby a shadow of the boundary 401 falls on the blur, and the blur may be stained. In addition, a control system becomes complicated since it is necessary to drive each of the plurality of subregions 402.

Therefore, in one embodiment, an element is uese in which the boundary 401 of electrode is not formed in the region 400 through which the effective imaging light flux can pass, namely a single electrode is provided in a direction perpendicular to the optical axis.

Further, as a method for realizing the transmittance distribution without forming the boundary of electrode in the region through which the effective imaging light flux can pass in the element, a method for providing a thickness distribution to the electrode, a method for utilizing a film resistance of the electrode or the like are included.

However, when such method is used, a coloring material is irreversibly modified by applying a high voltage with respect to an organic material which is easy to suppress coloring in an electrochromic material or a photochromic material.

Therefore, a variable control of the transmittance distribution becomes difficult in a wide range, or a lifetime of the element tends to significantly decrease when the variable control of the transmittance distribution is performed in the wide range.

To avoid such disadvantages, it is effective to utilize an element with a plurality of colored layers.

Figure 5:
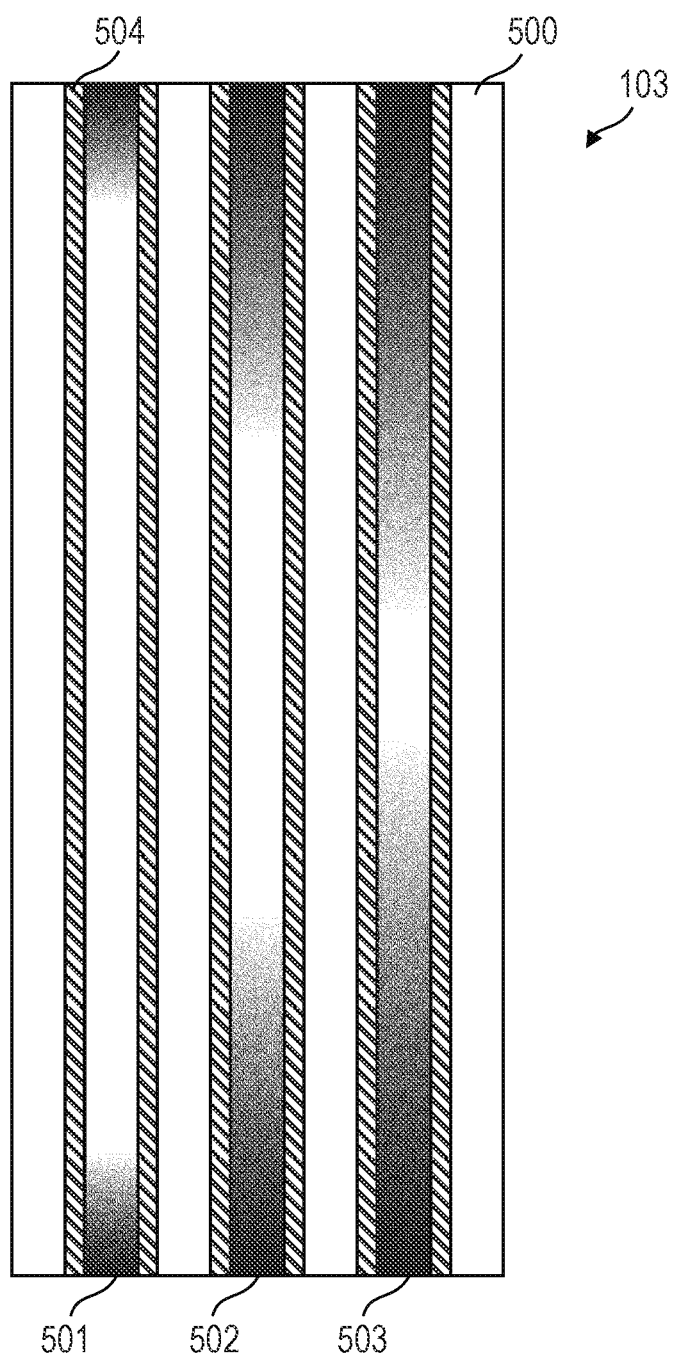
FIG. 5 is a schematic cross-sectional view of the distribution variable element having a plurality of colored layers with different transmittance distributions.

FIG. 5 shows a schematic cross-sectional view of an exemplary distribution variable element 103 having a plurality of colored layers with different transmittance distributions achieved at low voltages.

By using the distribution variable element 103 shown in FIG. 5, the transmittance distribution can be controlled in a wide range.

Specifically, in the distribution variable element 103 shown in FIG. 5, a first colored layer 501, a second colored layer 502 and a third colored layer 503 are sandwiched by electrode layers 504, and a voltage is applied via the electrode layers 504. The electrode layer 504 is formed on a substrate 500.

Although the distribution variable element 103 shown in FIG. 5 is consists of three colored layers, the number of colored layers and a structure of the distribution variable element 103 are not limited thereto.

In the distribution variable element 103 shown in FIG. 5, all boundary surfaces are formed in a plane, but the aspect of the embodiments is not limited to this, and they may be formed in a spherical or aspherical shape.

Further, in the distribution variable element 103 shown in FIG. 5, all colored layers are formed as an integral unit, but it is not needed in the aspect of the embodiments. For example, the colored layers may be separately arranged on an object side and the imaging plane IP side of the mechanical stop 102.

In the image pickup apparatus 100, a DMD (Digital Mirror Device) may be used as the distribution variable element 103.

The DMD is an element in which a lot of minute mirrors are aligned, and an orientation of each mirror can be individually controlled.

Thereby, each mirror can reflect an incident light beam in a desired direction, so that a transmission and a non-transmission can be controlled according to an incident position of the light beam.

The distribution variable element 103 may have a refractive power, and may have a function of a diffraction element or a reflection element.

In order to give an effect to an outline portion of a blur uniformly, in one embodiment, the transmittance distribution of the distribution variable element 103 and the aperture shape of the mechanical stop 102 have a high rotational symmetry about the optical axis in a co-axial optical system.

Figure 6:
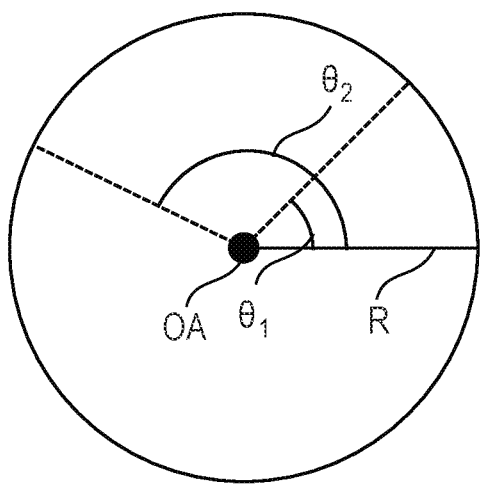
FIG. 6 is a schematic view of an aperture of the distribution variable element or a mechanical stop in a plane perpendicular to an optical axis.

FIG. 6 shows a schematic view of an opening of the distribution variable element 103 or the mechanical stop 102 in a plane perpendicular to the optical axis.

Specifically, as shown in FIG. 6, a maximum diameter of a region through which an effective imaging light flux can pass is represented by R, and the internally normalized transmittance at a radius $r \in [0, R]$ and an angle $\theta \in [0,2\pi]$ (rad) is represented by $g(r, \theta)$ in a state of a predetermined transmittance or a state of a predetermined opening.

At this time, in one embodiment, the transmittance distribution or the aperture shape is set such that the following inequality (23) is satisfied for any angles $\theta_1$ and $\theta_2$ in the image pickup apparatus 100:

$$\mathrm{ave}(|g(r;\theta_1)-g(r;\theta_2)|)[R/10,R]\leq 0.3 \qquad (23).$$

When the value exceeds the upper limit value in the inequality (23), a shape of an exit pupil of an axial light flux or an outline of a blur on the optical axis largely deviates from a circle, so that the blur becomes unnatural.

Further, in one embodiment, the following inequality (23a) is satisfied in the image pickup apparatus 100:

$$\mathrm{ave}(|g(r;\theta_1)-g(r;\theta_2)|)[R/10,R]\leq 0.15 \qquad (23a).$$

Furthermore, in another embodiment, the following inequality (23b) is satisfied in the image pickup apparatus 100:

$$\mathrm{ave}(|g(r;\theta_1)-g(r;\theta_2)|)[R/10,R]\leq 0.05 \qquad (23b).$$

The distribution variable element 103 may include an element having a transmittance distribution which cannot be variably controlled, and the imaging optical system 101 may include an element having a transmittance distribution which cannot be variably controlled.

Figure 7A:
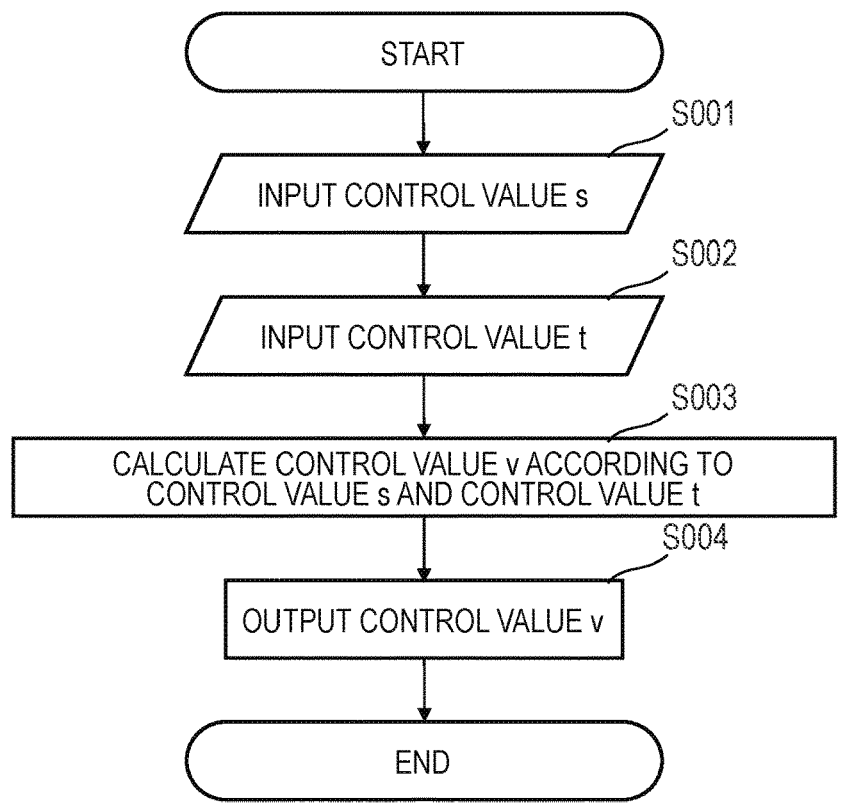
FIG. 7A is a flowchart showing an example of a control by the control unit in the optical apparatus according to the aspect of the embodiments.

FIG. 7A is a flowchart showing an example of a control by the control unit 104 in the image pickup apparatus 100.

The control by the control unit 104 includes a step of inputting a control value s (a first control value, control information) for specifying a diameter of the exit pupil by the mechanical stop 102, and a step of inputting a control value t (a second control value, control information) for specifying the transmittance distribution of the exit pupil.

Further, the control by the control unit 104 includes a step of determining a control value v (a third control value) for specifying the transmittance distribution of the distribution variable element 103 by using the control value s and the control value t.

That is, the transmittance distribution of the distribution variable element 103 and the aperture radius of the mechanical stop 102 are controlled based on the radius of the exit pupil and the transmittance distribution of the imaging optical system 101 in the image pickup apparatus 100.

Specifically, as shown in FIG. 7A, the control value s is input in step S001, and the control value t is input in step S002.

In step S003, the control value v is calculated according to the input control value s and control value t, and the control value v is output in step S004.

Note that the order of steps S001 and S002 may be mutually changed.

The image pickup apparatus 100 may directly control the control value v, and may calculate the control value v from either the control value s or the control value t.

Further, in the image pickup apparatus 100, a range of the value of the control value v may be limited by the control value s, the control value t or an imaging sensitivity, an exposure, a shutter speed, a zoom state, a focus state, an imaging scene, an imaging mode or the like.

Figure 7B:
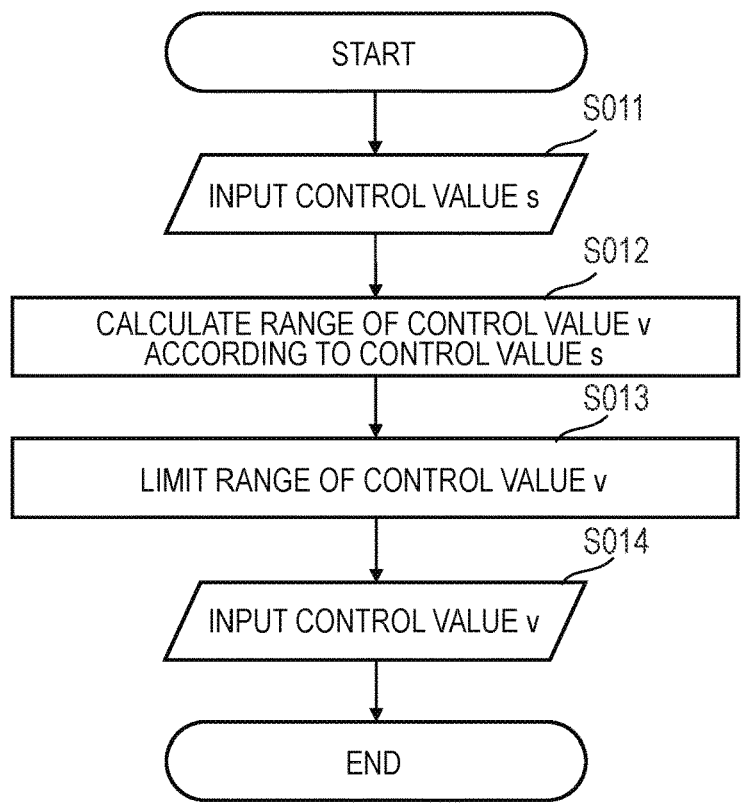
FIG. 7B is a flowchart showing another example of the control by the control unit in the optical apparatus according to the aspect of the embodiments.

FIG. 7B is a flowchart showing a case where such control is performed by the control unit 104.

Specifically, the control value s is input in step S011, and a range of the control value v is calculated according to the input control value s in step S012.

In step S013, the range of the control value v is limited, and in step S014, the control value v is input based on the range limited in step S013.

Here, the range of the control value v limited in step S013 may be displayed by a display unit (not shown) in order to prompt the input of the control value v in step S014.

Note that at least one of the control value s and the control value t is not necessarily input by the user, but may be determined based on the calculation result in the image pickup apparatus 100 and input to the control unit 104.

For example, the image pickup apparatus 100 may input at least one of the control value s and the control value t based on information such as an imaging sensitivity, an exposure, a shutter speed, a zoom state, a focus state, an imaging scene, an imaging mode or the like.

Further, the control value v is input in step S014 after the range of the control value v is limited in step S013 based on the input control value s as described above, but the aspect of the embodiments is not limited to this. For example, the control value t may be input in step S014 after the range of the control value t is limited in step S013 based on the input control value s.

In addition, the control value t may be determined so as to give a strong transmittance distribution when a subject is sufficiently bright, whereas not or hardly give a transmittance distribution when the subject is dark, for example.

F-value information generated by a program AE (Auto Exposure) function, a shutter speed priority AE function or the like may be used as the control value s.

The control value v need not be determined by the control value s and the control value t, but the control value v may be determined based on information such as the imaging sensitivity, the exposure, the shutter speed, the zoom state and the focus state.

In general, respective driving speeds of the mechanical stop 102 and the distribution variable element 103 are different from each other. Here, the driving speed is an inverse of time required for driving from a predetermined state to a desired state.

At this time, in one embodiment, they can be driven so as to match one whose driving speed is large with the other whose driving speed is small in the image pickup apparatuses 100.

Further, in one embodiment, the transmittance distribution can be changed continuously in a transient process during the driving in the distribution variable element 103.

In this way, an amount of light arriving at the imaging plane IP can be changed continuously in the transient process during the driving, so that a brightness of the image can be changed smoothly during pickuping a moving image.

In this case, the brightness of the recorded image may be kept constant in combination with an automatic exposure program.

Further, even when a still image is pickuped, it is possible to suppress a sudden change in brightness of a moving image displayed on a display device in the case that the image pickup apparatus 100 has the display device capable of confirming the moving image pickuped on the imaging plane IP in real time, for example.

In the image pickup apparatus 100, various control methods as described above can be used, a plurality of or all of such methods may be used in combination, and a plurality of or all of the control methods may be used by switching each other.

As described above, the control unit 104 receives the control value s and the control value t as input signals from the control value s input unit 106 and the control value t input unit 107, respectively, and outputs the control value v corresponding to the control value s and the control value t.

Here, as a method for determining the corresponding control value v, for example, there is a method in which a storage area 108 is provided in the image pickup apparatus 100, a control value v for each combination of the control value s and the control value t is stored as a numerical table in advance in the storage area 108, and the numerical table is referred to according to an input of the control values.

Figure 8:
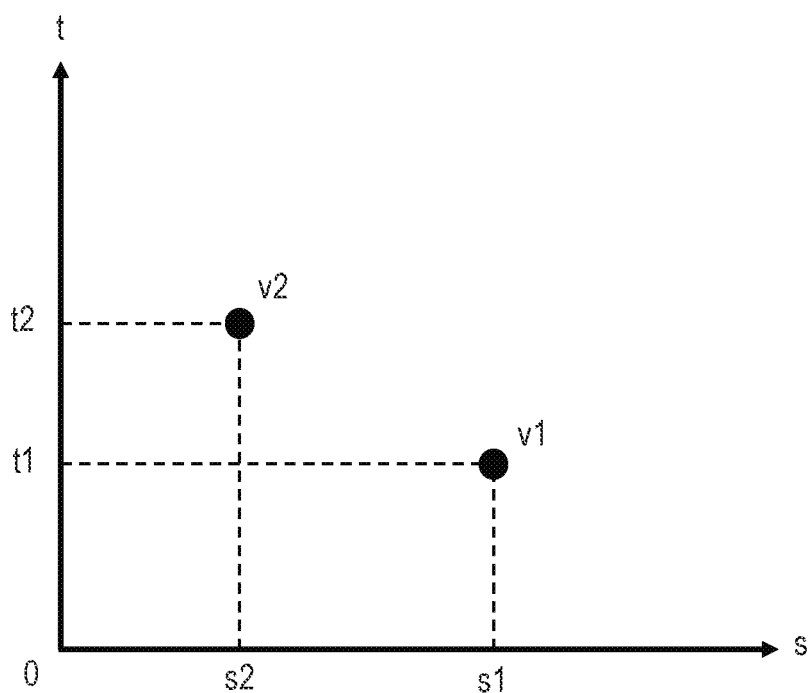
FIG. 8 is a schematic diagram of an exemplary numerical table stored in a storage area in the optical apparatus according to the aspect of the embodiments.

FIG. 8 shows a schematic diagram of an exemplary numerical table stored in the storage area 108.

In FIG. 8, for example, the corresponding control value $v_1$ is referred to in a combination of the control value $s_1$ and the control value $t_1$, and the corresponding control value $v_2$ is referred to in a combination of the control value $s_2$ and the control value $t_2$.

The control value v may be calculated by expressing the control value v as a function of the control value s and the control value t.

For example, a constant $a_{ij}$ can be stored in advance in the storage area 108 as a value for any i and j, and the control value v can be calculated by a function as represented by in the following expression (24) with respect to integers i and j equal to or larger than 0, an integer constant n equal to or larger than i, and an integer constant m equal to or larger than j:

$$v(s,t)=\Sigma_{i=0}^{n}\Sigma_{j=0}^{m}a_{ij}s^{i}t^{j} \quad (24).$$

Here, the control value v can be calculated more accurately by increasing the number of terms on the right side by increasing n and m in the polynomial function represented by the expression (24).

Further, it is not needed that the control value v is a scalar, and may be in the form of a vector or a matrix including a plurality of values.

The control value v is used for determining the transmittance distribution of the distribution variable element 103, but may be used for other purposes.

For example, the control value v can be used to control an exposure, a sensitivity of a solid-state imaging element, F-value, a shutter speed, an auto focus, a white balance or the like.

Figure 9:
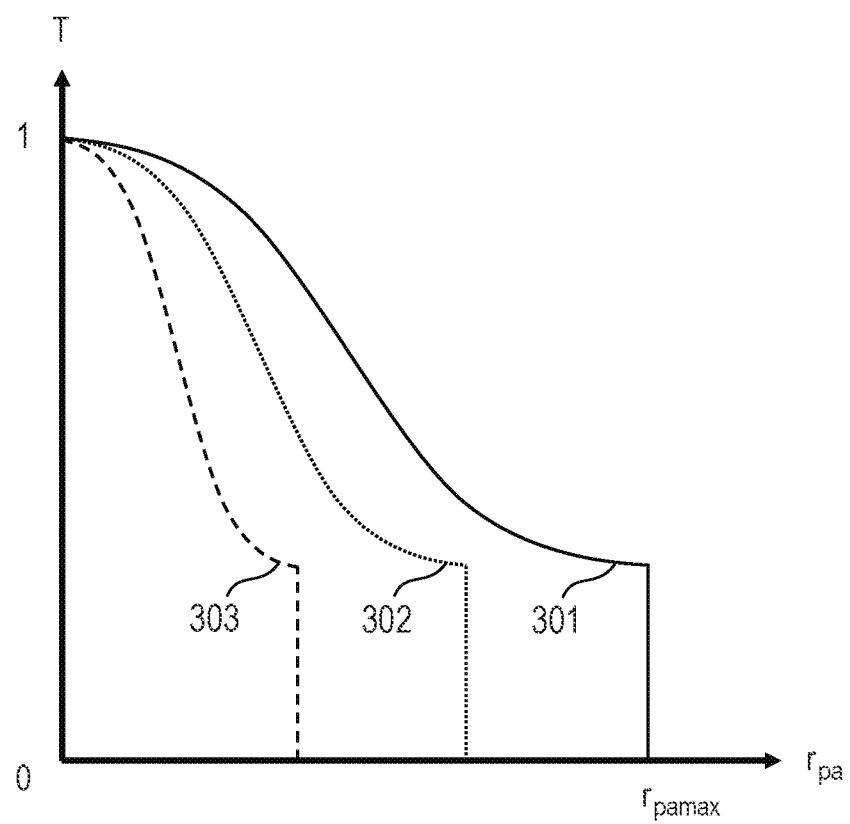
FIG. 9 is a graph showing an example of a change in a distribution of an entire system normalized transmittance when a radius of an exit pupil is changed in the optical apparatus according to the aspect of the embodiments.

FIG. 9 shows an example of a change in distribution of a transmittance on an exit pupil of an axial light flux, namely an entire system normalized transmittance T when an F-value, namely a diameter of the exit pupil is changed with keeping a smoothness of an outline of a blur constant.

More specifically, FIG. 9 shows an example of controlling the transmittance distribution of the exit pupil when the F-value is changed to $F_{max}$, $F_a$ and $F_b$ with respect to the F-values $F_a$ and $F_b$ satisfying $F_{max} < F_a < F_b$, in which the F-value during opening the mechanical stop 102 to a maximum aperture is represented by $F_{max}$.

In FIG. 9, curves 301, 302 and 303 show the distribution of the entire system normalized transmittance T when the F-value is $F_{max}$, $F_a$ and $F_b$, respectively.

At this time, the aperture radius $r_{sp}$ of the mechanical stop 102 is changed such that the diameter of the exit pupil corresponds to a desired F-value, and the transmittance distribution of the distribution variable element 103 is also changed cooperatively.

Thereby, the size of the blur can be changed with keeping the normalized transmittance D(1) at the outermost periphery of the exit pupil, namely a magnitude of the smoothing effect of the blur constant.

Note that it is not needed that the transmittance at the outermost periphery of the exit pupil is constant, and a control may be performed such that the transmittance at a position at which a normalized exit pupil radius $r_p$ is 0.95, 0.90, 0.85 or 0.80 is set to constant, for example.

Further, the transmittance at a plurality of positions described above may be referred to for control. For example, the control may be performed such that an average of the transmittance at the position at which the normalized exit pupil radius $r_p$ is 0.95 and the transmittance at the position at which the normalized exit pupil radius $r_p$ is 0.80 is set to constant.

Alternatively, the control may be performed such that a root sum square of the transmittance at the position at which the normalized exit pupil radius $r_p$ is 0.90 and the transmittance at the position at which the normalized exit pupil radius $r_p$ is 0.85 is set to constant.

In addition, although it is not needed to keep the transmittance constant, in this case, when D(1) before changing the F-value is represented by $D_a(1)$, and D(1) after changing the F-value is represented by $D_b(1)$ in which D(1) is set as a reference, for example, in one embodiment, the following inequality (25) is satisfied:

$$0.75 \leq D_a(1)/D_b(1) \leq 1.25 \quad (25).$$

When the ratio exceeds the upper limit value in the inequality (25), an outline of a blur becomes smoother in association with a change in F-value. On the other hand, when the ratio falls below the lower limit value in the inequality (25), the outline of the blur becomes clearer in association with the change in F-value.

Further, in the image pickup apparatus 100, when a maximum value of a transmittance and a value of the transmittance when the distribution variable element 103 has a predetermined transmittance distribution are represented by $T_m$ and $T_c(v, r_{pa})$, respectively, at a position through which a marginal ray of an axial light flux passes in the distribution variable element 103, in one embodiment, the following inequality (26) is satisfied when the exit pupil radius $r_{pa}$ is any of $r_{pamax}$ and $0.7 r_{pamax}$:

$$0.002 \leq T_c(v, r_{pa})/T_m \leq 0.500 \quad (26).$$

When the ratio exceeds the upper limit value in the inequality (26), it becomes difficult to smooth an outline of a blur in a wide range of the exit pupil radius $r_{pa}$.

On the other hand, when the ratio falls below the lower limit value in the inequality (26), it becomes difficult to clarify the outline of the blur in a wide range of the exit pupil radius $r_{pa}$.

In the image pickup apparatus 100, in another embodiment, the inequality (26) is satisfied even when the exit pupil radius $r_{pa}$ is $0.6 r_{pamax}$.

In this case, the outline of the blur can be smoothed over a wider range of the exit pupil radius $r_{pa}$.

Further, in one embodiment, the following inequality (26a) is satisfied in the image pickup apparatus 100:

$$0.002 \leq T_c(v, r_{pa})/T_m \leq 0.350 \quad (26a).$$

Furthermore, in another embodiment, the following inequality (26b) is satisfied in the image pickup apparatus 100:

$$0.002 \leq T_c(v, r_{pa})/T_m 0.250 \quad (26b).$$

When a total optical length of the image pickup apparatus 100 is represented by L, in one embodiment, the following inequality (27) is satisfied as a position at which the distribution variable element 103 is arranged in the image pickup apparatus 100:

$$0.00 \leq d_1/L \leq 0.35 \quad (27).$$

The total optical length is defined as a distance from the surface closest to the object side of the imaging optical system 101 to the image plane.

When the ratio exceeds the upper limit value in the inequality (27), an effect for the blur by the distribution variable element 103 is different between an upper line side and a lower line side of an off-axis light flux, so that the outline of the blur becomes nonuniform, especially when the mechanical stop 102 is opened to a maximum aperture.

Note that the ratio does not fall below the lower limit value in the inequality (27) based on the definition.

Further, when there are a portion forming a transmittance distribution and a portion hardly contributing to the transmittance distribution such as a substrate, a driving unit or the like in the distribution variable element 103, a position of the portion forming the transmittance distribution is recognized as the position of the distribution variable element 103.

In addition, when the distribution variable element 103 or the portion forming the transmittance distribution has a thickness in the optical axis direction, a center position in the optical axis direction is recognized as the position of the distribution variable element 103.

Further, in one embodiment, the following inequalities (27a) to (27d) are satisfied in this order in the image pickup apparatus 100:

$$0.00 \leq d_1/L \leq 0.30 \quad (27a)$$

$$0.00 \leq d_1/L \leq 0.26 \quad (27b)$$

$$0.00 \leq d_1/L \leq 0.20 \quad (27c)$$

$$0.00 \leq d_1/L \leq 0.10 \quad (27d).$$

In the image pickup apparatus 100, a minimum effect can be obtained when the inequality (27) is satisfied in one imaging state.

However, in the case that an optical path of an outermost off-axis light flux is largely changed by zooming, focusing or the like, in one embodiment, the distribution variable element 103 is also moved in the optical axis direction in association with zooming or focusing such that the inequality (27) is satisfied.

In the image pickup apparatus 100, in one embodiment, the following inequality (28) is satisfied as a position at which the distribution variable element 103 is arranged:

$$0.00 \le d_2/L \le 0.35 \quad (28).$$

When the ratio exceeds the upper limit value in the inequality (28), an effect for the blur by the distribution variable element 103 is different between an upper line side and a lower line side of an off-axis light flux, so that the outline of the blur becomes nonuniform when the mechanical stop 102 is narrowed.

Note that the ratio does not fall below the lower limit value in the inequality (28) based on the definition.

Further, in one embodiment, the following inequalities (28a) to (28c) are satisfied in this order in the image pickup apparatus 100:

$$0.00 \le d_2/L \le 0.30 \quad (28a)$$

$$0.00 \le d_2/L \le 0.25 \quad (28b)$$

$$0.00 \le d_2/L \le 0.10 \quad (28c).$$

At this time, an uniformity of the outline of the blur can be further enhanced in a wider range of the exit pupil diameter defined by the mechanical stop 102.

In the image pickup apparatus 100, when the aperture radius $r_{sp}$ of the mechanical stop 102 is set to the maximum value $r_{spmax}$, and light flux widths in the meridional cross section of the outermost off-axis light flux and the axial light flux which form an image on the imaging plane IP when they are incident on the imaging optical system 101 are represented by $w_{10}$ and $w_0$, respectively, in one embodiment, the following inequality (29) is satisfied:

$$0.7 \le w_{10}/w_0 \le 1.3 \quad (29).$$

When the ratio exceeds the upper limit value or falls below the lower limit value in the inequality (29), a difference between respective light flux widths of the axial light flux and the off-axis light flux becomes large, so that an action of the distribution variable element 103 on each light flux becomes nonuniform in a screen.

Further, in another embodiment, the following inequality (29a) is satisfied in the image pickup apparatus 100:

$$0.75 \le w_{10}/w_0 \le 1.20 \quad (29a).$$

Furthermore, in yet another embodiment, the following inequality (29b) is satisfied in the image pickup apparatus 100:

$$0.9 \le w_{10}/w_0 \le 1.1 \quad (29b).$$

When the aperture radius $r_{sp}$ of the mechanical stop 102 is set to the maximum value $r_{spmax}$, the light flux width of the axial light flux in the direction perpendicular to the optical axis in the meridional cross section on the distribution variable element 103 is represented by $w_{b0}$, and a width in the direction perpendicular to the optical axis of a portion in which the outermost off-axis light flux and the axial light flux overlap each other on the distribution variable element 103 is represented by $w_{lap}$.

At this time, in one embodiment, the following inequality (30) is satisfied in the image pickup apparatus 100:

$$0.6 \le (w_{lap}/w_{b0})/(w_{10}/w_0) \le 1.3 \quad (30).$$

Figure 10:
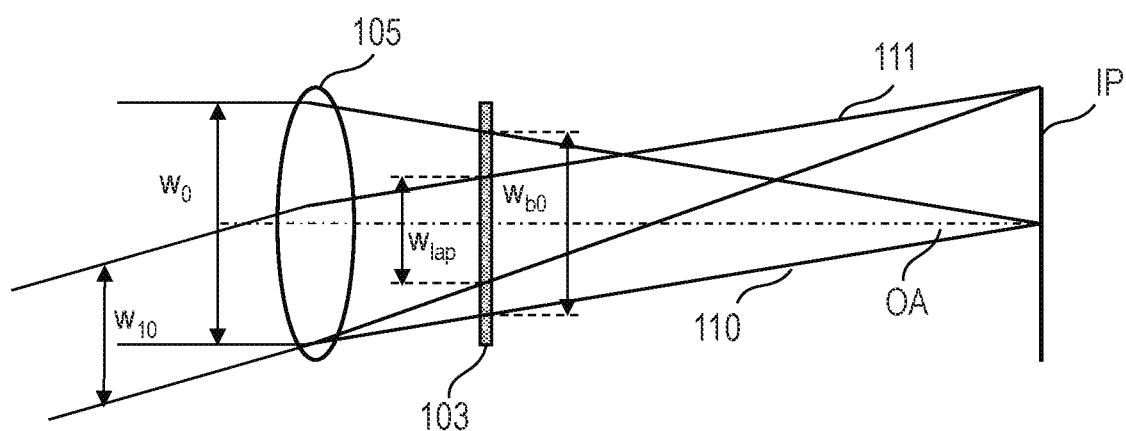
FIG. 10 is a diagram schematically showing each of light flux widths in the optical apparatus according to the aspect of the embodiments.

FIG. 10 schematically shows the widths $w_{10}$, $w_0$, $w_{b0}$ and $w_{lap}$ used in inequality (30).

When the ratio falls below the lower limit value in the inequality (30), the transmittance of the off-axis light flux is largely reduced by the distribution variable element 103, so that a peripheral light amount is significantly reduced.

On the other hand, when the ratio exceeds the upper limit value in the inequality (30), the difference between respective light flux widths of the axial light flux and the off-axis light flux becomes large, so that the action of the distribution variable element 103 on each light flux becomes nonuniform in the screen.

Further, in one embodiment, the following inequality (30a) is satisfied in the image pickup apparatus 100:

$$0.7 \le (w_{lap}/w_{b0})/(w_{10}/w_0) \le 1.2 \quad (30a).$$

In the image pickup apparatus 100, a plurality of distribution variable elements 103 may be provided in the imaging optical system 101.

In addition, when the plurality of distribution variable elements 103 are provided, respective transmittance distributions of the plurality of distribution variable elements 103 may be the same or different from each other.

Then, by arranging the distribution variable element 103 at an appropriate position, an uniformity of a smoothness of the outline of the blur by the off-axis light flux can be enhanced.

Further, in the image pickup apparatus 100, a plurality of mechanical apertures 102 may be provided in the imaging optical system 101.

The image pickup apparatus 100 is not limited to a general camera or the like, but may be binoculars, a monocular, a microscope or the like.

Next, each example of the optical apparatus according to the aspect of the embodiments will be specifically described.

In each of the following examples, a refractive index and an Abbe number of the distribution variable element 103 are 1.5163 and 64.14, respectively, and are uniform, but it is not needed that they are above-described values and uniform.

Further, the transmittance distribution of the exit pupil is calculated on the assumption that the transmittance distribution is formed at the center position in the optical axis direction of the distribution variable element 103.

Example 1

Figure 11A:
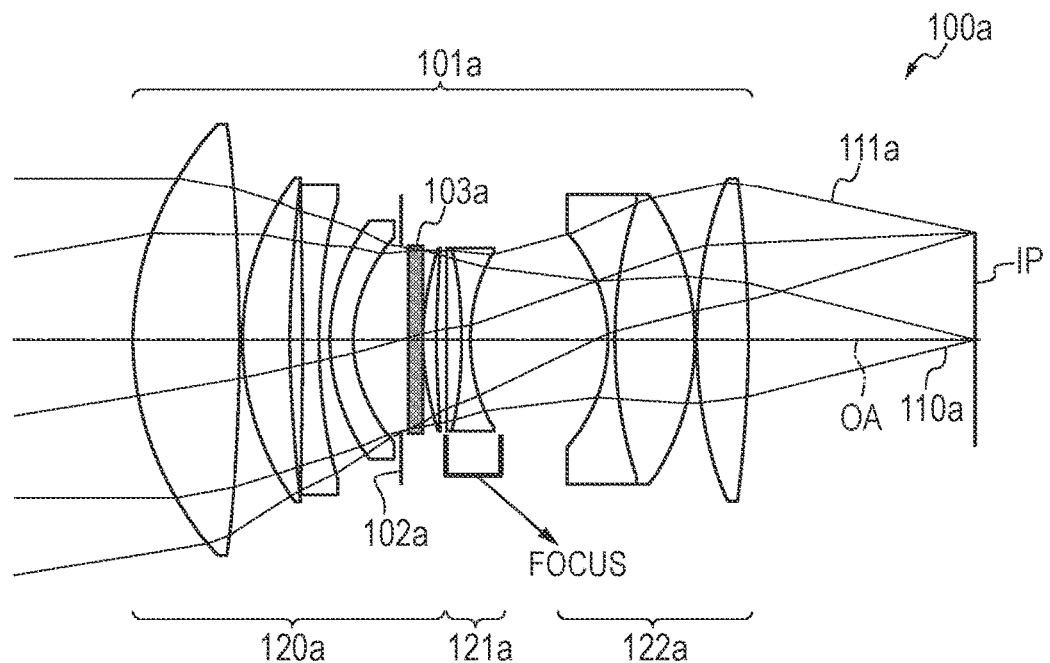
FIG. 11A is a cross-sectional view of the image pickup apparatus including the optical apparatus according to Example 1 of the aspect of the embodiments when focusing on an object at infinity.

FIG. 11A shows a cross-sectional view of an image pickup apparatus 100a including the optical apparatus according to Example 1 when focusing on an object at infinity.

The image pickup apparatus 100a has the same structure as that of the embodiment shown in FIG. 1 except for the imaging optical system 101a.

In each lens cross-sectional view, the left side is the object side and the right side is the image side. The imaging optical system of each Example includes a plurality of lens units. A lens unit described herein is a group of lenses that move or stay integrally during focusing. That is, an interval between adjacent lens units changes during focusing from an infinity to a close distance in the imaging optical system of each Example. The lens unit may consist of one lens or a plurality of lenses.

As shown in FIG. 11A, the imaging optical system 101a includes a mechanical stop 102a and a distribution variable element 103a.

The mechanical stop 102a and the distribution variable element 103a operate by receiving an input signal from a control unit (not shown).

In FIG. 11A, an axial light flux 110a and an outermost off-axis light flux 111a are also shown.

Further, the imaging optical system 101a has a three-unit structure including, in order from the object side to the image side, a first lens unit 120a having a positive refractive power, a second lens unit 121a having a negative refractive power and a third lens unit 122a having a positive refractive power.

In the imaging optical system 101a, a 9th surface is the mechanical stop 102a, and 10th and 11th surfaces are an incident surface and an exit surface of the distribution variable element 103a, respectively, namely the distribution variable element 103a is arranged adjacent to the image side of the mechanical stop 102a.

In the image pickup apparatus 100a, focusing is performed by moving the second lens unit 121a having a negative refractive power to the image side.

In the image pickup apparatus 100a, it is assumed that the transmittance distribution of the distribution variable element 103a is expressed by the expression (11).

When the mechanical stop 102a is opened to the maximum aperture, namely the aperture radius $r_{sp}$ is set to the maximum value $r_{spmax}$, the distribution of the entire system normalized transmittance T in the meridional cross sections of the axial light flux and the outermost off-axis light flux at the various coefficients A and B is shown in the following Tables 1 and 2, respectively.

TABLE 11

| | | A | | | | |
|---|---|---|---|---|---|---|
| | | 1.1 | 1.1 | 1.1 | 2 | 4 |
| | | | | B | | |
| | | 100000 | 4 | 2.4 | 2 | 2 |
| $r_p$ | 0 | 1.00 | 1.00 | 1.00 | 1.00 | 1.00 |
| | 0.05 | 1.00 | 1.00 | 1.00 | 1.00 | 0.99 |
| | 0.1 | 1.00 | 1.00 | 0.99 | 0.98 | 0.97 |
| | 0.15 | 1.00 | 0.99 | 0.99 | 0.96 | 0.92 |
| | 0.2 | 1.00 | 0.99 | 0.97 | 0.93 | 0.85 |
| | 0.25 | 1.00 | 0.99 | 0.96 | 0.89 | 0.75 |
| | 0.3 | 1.00 | 0.98 | 0.94 | 0.83 | 0.65 |
| | 0.35 | 1.00 | 0.97 | 0.92 | 0.75 | 0.55 |
| | 0.4 | 1.00 | 0.96 | 0.89 | 0.67 | 0.47 |
| | 0.45 | 1.00 | 0.95 | 0.85 | 0.60 | 0.37 |
| | 0.5 | 1.00 | 0.94 | 0.81 | 0.53 | 0.28 |
| | 0.55 | 1.00 | 0.92 | 0.76 | 0.46 | 0.21 |
| | 0.6 | 1.00 | 0.91 | 0.70 | 0.38 | 0.15 |
| | 0.65 | 1.00 | 0.89 | 0.65 | 0.31 | 0.09 |
| | 0.7 | 1.00 | 0.87 | 0.59 | 0.24 | 0.06 |
| | 0.75 | 1.00 | 0.85 | 0.55 | 0.18 | 0.03 |
| | 0.8 | 1.00 | 0.82 | 0.50 | 0.12 | 0.01 |
| | 0.85 | 1.00 | 0.79 | 0.44 | 0.07 | 0.01 |
| | 0.9 | 1.00 | 0.76 | 0.38 | 0.04 | 0.00 |
| | 0.95 | 1.00 | 0.73 | 0.31 | 0.01 | 0.00 |
| | 1 | 1.00 | 0.69 | 0.26 | 0.00 | 0.00 |

TABLE 21

| | | A | | | | |
|---|---|---|---|---|---|---|
| | | 1.1 | 1.1 | 1.1 | 2 | 4 |
| | | | | B | | |
| | | 100000 | 4 | 2.4 | 2 | 2 |
| $r_p$ | 0 | 1.00 | 0.70 | 0.28 | 0.00 | 0.00 |
| | −0.95 | 1.00 | 0.73 | 0.33 | 0.02 | 0.00 |
| | −0.9 | 1.00 | 0.76 | 0.39 | 0.04 | 0.00 |
| | −0.85 | 1.00 | 0.79 | 0.45 | 0.08 | 0.01 |
| | −0.8 | 1.00 | 0.82 | 0.50 | 0.12 | 0.01 |
| | −0.75 | 1.00 | 0.84 | 0.54 | 0.17 | 0.03 |
| | −0.7 | 1.00 | 0.87 | 0.59 | 0.23 | 0.05 |
| | −0.65 | 1.00 | 0.89 | 0.63 | 0.29 | 0.08 |
| | −0.6 | 1.00 | 0.90 | 0.68 | 0.35 | 0.13 |
| | −0.55 | 1.00 | 0.92 | 0.73 | 0.43 | 0.18 |
| | −0.5 | 1.00 | 0.93 | 0.78 | 0.50 | 0.25 |
| | −0.45 | 1.00 | 0.95 | 0.83 | 0.56 | 0.32 |
| | −0.4 | 1.00 | 0.96 | 0.87 | 0.63 | 0.41 |
| | −0.35 | 1.00 | 0.97 | 0.90 | 0.70 | 0.50 |
| | −0.3 | 1.00 | 0.97 | 0.92 | 0.78 | 0.58 |
| | −0.25 | 1.00 | 0.98 | 0.95 | 0.85 | 0.68 |
| | −0.2 | 1.00 | 0.99 | 0.96 | 0.90 | 0.78 |
| | −0.15 | 1.00 | 0.99 | 0.98 | 0.94 | 0.87 |
| | −0.1 | 1.00 | 1.00 | 0.99 | 0.97 | 0.93 |
| | −0.05 | 1.00 | 1.00 | 0.99 | 0.99 | 0.97 |
| | 0 | 1.00 | 1.00 | 1.00 | 1.00 | 0.99 |
| | 0.05 | 1.00 | 1.00 | 1.00 | 1.00 | 1.00 |
| | 0.1 | 1.00 | 1.00 | 1.00 | 0.99 | 0.99 |
| | 0.15 | 1.00 | 1.00 | 0.99 | 0.98 | 0.96 |
| | 0.2 | 1.00 | 0.99 | 0.98 | 0.96 | 0.92 |
| | 0.25 | 1.00 | 0.99 | 0.97 | 0.93 | 0.85 |
| | 0.3 | 1.00 | 0.98 | 0.96 | 0.88 | 0.75 |
| | 0.35 | 1.00 | 0.98 | 0.94 | 0.82 | 0.64 |
| | 0.4 | 1.00 | 0.97 | 0.91 | 0.75 | 0.55 |
| | 0.45 | 1.00 | 0.96 | 0.88 | 0.67 | 0.46 |
| | 0.5 | 1.00 | 0.95 | 0.85 | 0.59 | 0.36 |
| | 0.55 | 1.00 | 0.94 | 0.80 | 0.52 | 0.27 |
| | 0.6 | 1.00 | 0.92 | 0.75 | 0.45 | 0.20 |
| | 0.65 | 1.00 | 0.91 | 0.70 | 0.37 | 0.14 |
| | 0.7 | 1.00 | 0.89 | 0.64 | 0.29 | 0.09 |
| | 0.75 | 1.00 | 0.87 | 0.58 | 0.23 | 0.05 |
| | 0.8 | 1.00 | 0.84 | 0.53 | 0.16 | 0.03 |
| | 0.85 | 1.00 | 0.82 | 0.48 | 0.11 | 0.01 |
| | 0.9 | 1.00 | 0.78 | 0.42 | 0.06 | 0.00 |
| | 0.95 | 1.00 | 0.75 | 0.36 | 0.03 | 0.00 |
| | 1 | 1.00 | 0.72 | 0.29 | 0.01 | 0.00 |

Note that positions of the upper line, the lower line, and the principal ray of the outermost off-axis light flux 111a are set to −1, 1 and 0, respectively, and a normalization is performed at each of the upper line side and the lower line side since the outermost off-axis light flux 111a is asymmetrical between the upper line side and the lower line side.

Further, the transmittance is normalized by the maximum transmittance of the outermost off-axis light flux.

The above-described treatment for the distribution of the entire system normalized transmittance T is the same in the following Examples 2 to 4.

When the aperture radius $r_{sp}$ of the mechanical stop 102a is set to $0.7r_{spm}$, the distribution of the entire system normalized transmittance T in the meridional cross sections of the axial light flux and the outermost off-axis light flux at the various coefficients A and B is shown in the following Tables 3 and 4, respectively.

TABLE 31

| | | A | | | | | |
|---|---|---|---|---|---|---|---|
| | | 1.1 | 1.1 | 1.1 | 2 | 4 | 8.5 |
| | | | | B | | | |
| | | 100000 | 4 | 2.4 | 2 | 2 | 2 |
| $r_p$ | 0 | 1.00 | 1.00 | 1.00 | 1.00 | 1.00 | 1 |
| | 0.05 | 1.00 | 1.00 | 1.00 | 1.00 | 1.00 | 0.99 |
| | 0.1 | 1.00 | 1.00 | 1.00 | 0.99 | 0.98 | 0.96 |
| | 0.15 | 1.00 | 1.00 | 0.99 | 0.98 | 0.96 | 0.91 |
| | 0.2 | 1.00 | 1.00 | 0.99 | 0.96 | 0.93 | 0.84 |
| | 0.25 | 1.00 | 0.99 | 0.98 | 0.94 | 0.89 | 0.74 |
| | 0.3 | 1.00 | 0.99 | 0.97 | 0.92 | 0.83 | 0.63 |
| | 0.35 | 1.00 | 0.99 | 0.96 | 0.89 | 0.76 | 0.54 |
| | 0.4 | 1.00 | 0.98 | 0.95 | 0.85 | 0.68 | 0.45 |
| | 0.45 | 1.00 | 0.98 | 0.93 | 0.80 | 0.61 | 0.36 |
| | 0.5 | 1.00 | 0.97 | 0.91 | 0.74 | 0.54 | 0.28 |
| | 0.55 | 1.00 | 0.96 | 0.89 | 0.68 | 0.48 | 0.21 |
| | 0.6 | 1.00 | 0.96 | 0.87 | 0.63 | 0.41 | 0.15 |
| | 0.65 | 1.00 | 0.95 | 0.84 | 0.58 | 0.34 | 0.10 |
| | 0.7 | 1.00 | 0.94 | 0.81 | 0.53 | 0.29 | 0.07 |
| | 0.75 | 1.00 | 0.93 | 0.77 | 0.48 | 0.23 | 0.04 |
| | 0.8 | 1.00 | 0.92 | 0.73 | 0.43 | 0.18 | 0.03 |
| | 0.85 | 1.00 | 0.91 | 0.69 | 0.37 | 0.14 | 0.02 |
| | 0.9 | 1.00 | 0.89 | 0.66 | 0.32 | 0.10 | 0.01 |
| | 0.95 | 1.00 | 0.88 | 0.62 | 0.27 | 0.07 | 0.00 |
| | 1 | 1.00 | 0.86 | 0.58 | 0.22 | 0.05 | 0.00 |

TABLE 4

| | A | 1.1 | 1.1 | 1.1 | 2 | 4 |
|---|---|---|---|---|---|---|
| | B | 100000 | 4 | 2.4 | 2 | 2 |
| $r_p$ | −1 | 1.00 | 0.84 | 0.54 | 0.17 | 0.03 |
| | −0.95 | 1.00 | 0.86 | 0.58 | 0.21 | 0.05 |
| | −0.9 | 1.00 | 0.88 | 0.61 | 0.26 | 0.07 |
| | −0.85 | 1.00 | 0.89 | 0.64 | 0.30 | 0.09 |
| | −0.8 | 1.00 | 0.90 | 0.68 | 0.35 | 0.13 |
| | −0.75 | 1.00 | 0.91 | 0.72 | 0.40 | 0.16 |
| | −0.7 | 1.00 | 0.93 | 0.76 | 0.46 | 0.21 |
| | −0.65 | 1.00 | 0.93 | 0.79 | 0.51 | 0.26 |
| | −0.6 | 1.00 | 0.94 | 0.82 | 0.55 | 0.31 |
| | −0.55 | 1.00 | 0.95 | 0.85 | 0.60 | 0.37 |
| | −0.5 | 1.00 | 0.96 | 0.88 | 0.65 | 0.44 |
| | −0.45 | 1.00 | 0.97 | 0.90 | 0.71 | 0.51 |
| | −0.4 | 1.00 | 0.97 | 0.92 | 0.77 | 0.57 |
| | −0.35 | 1.00 | 0.98 | 0.94 | 0.82 | 0.63 |
| | −0.3 | 1.00 | 0.98 | 0.95 | 0.86 | 0.71 |
| | −0.25 | 1.00 | 0.99 | 0.96 | 0.90 | 0.78 |
| | −0.2 | 1.00 | 0.99 | 0.97 | 0.93 | 0.85 |
| | −0.15 | 1.00 | 0.99 | 0.98 | 0.95 | 0.90 |
| | −0.1 | 1.00 | 1.00 | 0.99 | 0.97 | 0.94 |
| | −0.05 | 1.00 | 1.00 | 0.99 | 0.98 | 0.97 |
| | 0 | 1.00 | 1.00 | 1.00 | 0.99 | 0.99 |
| | 0.05 | 1.00 | 1.00 | 1.00 | 1.00 | 1.00 |
| | 0.1 | 1.00 | 1.00 | 1.00 | 1.00 | 1.00 |
| | 0.15 | 1.00 | 1.00 | 1.00 | 1.00 | 0.99 |
| | 0.2 | 1.00 | 1.00 | 1.00 | 0.99 | 0.98 |
| | 0.25 | 1.00 | 1.00 | 0.99 | 0.98 | 0.95 |
| | 0.3 | 1.00 | 0.99 | 0.98 | 0.96 | 0.92 |
| | 0.35 | 1.00 | 0.99 | 0.98 | 0.94 | 0.87 |
| | 0.4 | 1.00 | 0.99 | 0.97 | 0.91 | 0.80 |
| | 0.45 | 1.00 | 0.98 | 0.95 | 0.87 | 0.72 |
| | 0.5 | 1.00 | 0.98 | 0.94 | 0.83 | 0.64 |
| | 0.55 | 1.00 | 0.97 | 0.92 | 0.77 | 0.57 |
| | 0.6 | 1.00 | 0.97 | 0.90 | 0.71 | 0.51 |
| | 0.65 | 1.00 | 0.96 | 0.88 | 0.65 | 0.44 |
| | 0.7 | 1.00 | 0.95 | 0.85 | 0.60 | 0.37 |
| | 0.75 | 1.00 | 0.94 | 0.82 | 0.55 | 0.30 |
| | 0.8 | 1.00 | 0.93 | 0.79 | 0.50 | 0.25 |
| | 0.85 | 1.00 | 0.92 | 0.75 | 0.44 | 0.19 |
| | 0.9 | 1.00 | 0.91 | 0.71 | 0.38 | 0.15 |
| | 0.95 | 1.00 | 0.90 | 0.66 | 0.32 | 0.11 |
| | 1 | 1.00 | 0.88 | 0.62 | 0.28 | 0.08 |

When the aperture radius $r_{sp}$ of the mechanical stop 102a is set to $0.5 r_{spm}$, the distribution of the entire system normalized transmittance T in the meridional cross sections of the axial light flux and the outermost off-axis light flux at the various coefficients A and B is shown in the following Tables 5 and 6, respectively.

TABLE 5

| | A | 1.1 | 1.1 | 2 | 4 | 8.5 | 17 |
|---|---|---|---|---|---|---|---|
| | B | 100000 | 2.4 | 2 | 2 | 2 | 2 |
| $r_p$ | 0 | 1.00 | 1.00 | 1.00 | 1.00 | 1.00 | 1.00 |
| | 0.05 | 1.00 | 1.00 | 1.00 | 1.00 | 1.00 | 0.99 |
| | 0.1 | 1.00 | 1.00 | 1.00 | 0.99 | 0.98 | 0.96 |
| | 0.15 | 1.00 | 1.00 | 0.99 | 0.98 | 0.96 | 0.91 |
| | 0.2 | 1.00 | 0.99 | 0.98 | 0.96 | 0.92 | 0.83 |
| | 0.25 | 1.00 | 0.99 | 0.97 | 0.94 | 0.87 | 0.73 |
| | 0.3 | 1.00 | 0.98 | 0.96 | 0.92 | 0.81 | 0.62 |
| | 0.35 | 1.00 | 0.98 | 0.94 | 0.88 | 0.73 | 0.53 |
| | 0.4 | 1.00 | 0.97 | 0.93 | 0.84 | 0.66 | 0.45 |
| | 0.45 | 1.00 | 0.96 | 0.90 | 0.80 | 0.59 | 0.35 |
| | 0.5 | 1.00 | 0.96 | 0.88 | 0.74 | 0.53 | 0.28 |
| | 0.55 | 1.00 | 0.95 | 0.85 | 0.69 | 0.46 | 0.21 |
| | 0.6 | 1.00 | 0.94 | 0.82 | 0.63 | 0.39 | 0.16 |
| | 0.65 | 1.00 | 0.92 | 0.78 | 0.58 | 0.33 | 0.11 |
| | 0.7 | 1.00 | 0.91 | 0.74 | 0.54 | 0.27 | 0.08 |
| | 0.75 | 1.00 | 0.90 | 0.70 | 0.50 | 0.22 | 0.05 |
| | 0.8 | 1.00 | 0.88 | 0.66 | 0.45 | 0.18 | 0.03 |
| | 0.85 | 1.00 | 0.86 | 0.62 | 0.40 | 0.14 | 0.02 |
| | 0.9 | 1.00 | 0.84 | 0.58 | 0.35 | 0.11 | 0.01 |
| | 0.95 | 1.00 | 0.82 | 0.55 | 0.30 | 0.08 | 0.01 |
| | 1 | 1.00 | 0.79 | 0.51 | 0.27 | 0.06 | 0.00 |

TABLE 6

| | A | 1.1 | 1.1 | 2 | 4 | 8.5 | 17 |
|---|---|---|---|---|---|---|---|
| | B | 100000 | 2.4 | 2 | 2 | 2 | 2 |
| $r_p$ | −1 | 1.00 | 0.75 | 0.45 | 0.20 | 0.03 | 0.00 |
| | −0.95 | 1.00 | 0.78 | 0.49 | 0.24 | 0.05 | 0.01 |
| | −0.9 | 1.00 | 0.80 | 0.52 | 0.28 | 0.07 | 0.01 |
| | −0.85 | 1.00 | 0.82 | 0.56 | 0.31 | 0.09 | 0.02 |
| | −0.8 | 1.00 | 0.85 | 0.59 | 0.36 | 0.11 | 0.03 |
| | −0.75 | 1.00 | 0.86 | 0.62 | 0.40 | 0.15 | 0.05 |
| | −0.7 | 1.00 | 0.88 | 0.66 | 0.46 | 0.19 | 0.08 |
| | −0.65 | 1.00 | 0.90 | 0.70 | 0.50 | 0.23 | 0.11 |
| | −0.6 | 1.00 | 0.91 | 0.74 | 0.54 | 0.28 | 0.16 |
| | −0.55 | 1.00 | 0.93 | 0.78 | 0.59 | 0.33 | 0.21 |
| | −0.5 | 1.00 | 0.94 | 0.82 | 0.63 | 0.39 | 0.28 |
| | −0.45 | 1.00 | 0.95 | 0.85 | 0.69 | 0.46 | 0.35 |
| | −0.4 | 1.00 | 0.96 | 0.88 | 0.74 | 0.53 | 0.45 |
| | −0.35 | 1.00 | 0.97 | 0.91 | 0.80 | 0.59 | 0.53 |
| | −0.3 | 1.00 | 0.97 | 0.93 | 0.84 | 0.66 | 0.62 |
| | −0.25 | 1.00 | 0.98 | 0.94 | 0.88 | 0.73 | 0.73 |
| | −0.2 | 1.00 | 0.98 | 0.96 | 0.92 | 0.81 | 0.83 |
| | −0.15 | 1.00 | 0.99 | 0.97 | 0.94 | 0.87 | 0.91 |
| | −0.1 | 1.00 | 0.99 | 0.98 | 0.96 | 0.92 | 0.96 |
| | −0.05 | 1.00 | 1.00 | 0.99 | 0.98 | 0.96 | 0.99 |
| | 0 | 1.00 | 1.00 | 1.00 | 0.99 | 0.98 | 1.00 |
| | 0.05 | 1.00 | 1.00 | 1.00 | 1.00 | 0.99 | 0.99 |
| | 0.1 | 1.00 | 1.00 | 1.00 | 1.00 | 1.00 | 0.96 |
| | 0.15 | 1.00 | 1.00 | 1.00 | 1.00 | 1.00 | 0.91 |
| | 0.2 | 1.00 | 1.00 | 1.00 | 0.99 | 0.98 | 0.83 |
| | 0.25 | 1.00 | 1.00 | 0.99 | 0.98 | 0.96 | 0.73 |
| | 0.3 | 1.00 | 0.99 | 0.98 | 0.96 | 0.92 | 0.62 |
| | 0.35 | 1.00 | 0.99 | 0.97 | 0.94 | 0.87 | 0.53 |
| | 0.4 | 1.00 | 0.98 | 0.96 | 0.92 | 0.81 | 0.45 |
| | 0.45 | 1.00 | 0.98 | 0.94 | 0.88 | 0.73 | 0.35 |
| | 0.5 | 1.00 | 0.97 | 0.93 | 0.84 | 0.65 | 0.28 |
| | 0.55 | 1.00 | 0.96 | 0.90 | 0.79 | 0.58 | 0.21 |
| | 0.6 | 1.00 | 0.96 | 0.88 | 0.74 | 0.52 | 0.16 |
| | 0.65 | 1.00 | 0.95 | 0.85 | 0.68 | 0.45 | 0.11 |
| | 0.7 | 1.00 | 0.93 | 0.81 | 0.62 | 0.38 | 0.08 |
| | 0.75 | 1.00 | 0.92 | 0.77 | 0.57 | 0.31 | 0.05 |
| | 0.8 | 1.00 | 0.91 | 0.73 | 0.53 | 0.26 | 0.03 |
| | 0.85 | 1.00 | 0.89 | 0.69 | 0.48 | 0.21 | 0.02 |
| | 0.9 | 1.00 | 0.88 | 0.65 | 0.43 | 0.17 | 0.01 |

TABLE 6-continued

| A | 1.1 | 1.1 | 2 | 4 | 8.5 | 17 |
|---|---|---|---|---|---|---|
| B | 100000 | 2.4 | 2 | 2 | 2 | 2 |
| 0.95 | 1.00 | 0.86 | 0.60 | 0.38 | 0.13 | 0.01 |
| 1 | 1.00 | 0.83 | 0.57 | 0.33 | 0.10 | 0.00 |

Note that values of the coefficients A and B described in Tables 1 to 6 are examples, and the aspect of the embodiments is not limited thereto. The coefficients A and B can take various values in the image pickup apparatus $100a$.

As shown in Tables 1, 3 and 5, the transmittances D(1) at an effective diameter end of the exit pupil of the axial light flux are substantially equal to each other in the following three sets (a) to (c), for example:

(a) $r_{sp}=r_{spmax}, A=1.1, B=2.4$ (b) $r_{sp}=0.7r_{spmax}, A=2, B=2$ (c) $r_{sp}=0.5r_{spmax}, A=4, B=2$.

Therefore, when a size of the blur is changed with keeping the transmittance D(1) at the effective diameter end constant, namely the smoothness of the outline of the blur, the control value v may be determined so as to have the transmittance distribution corresponding to A and B as represented by (a) to (c) according to a change in control value s defining the size of the blur.

Example 2

Figure 11B:
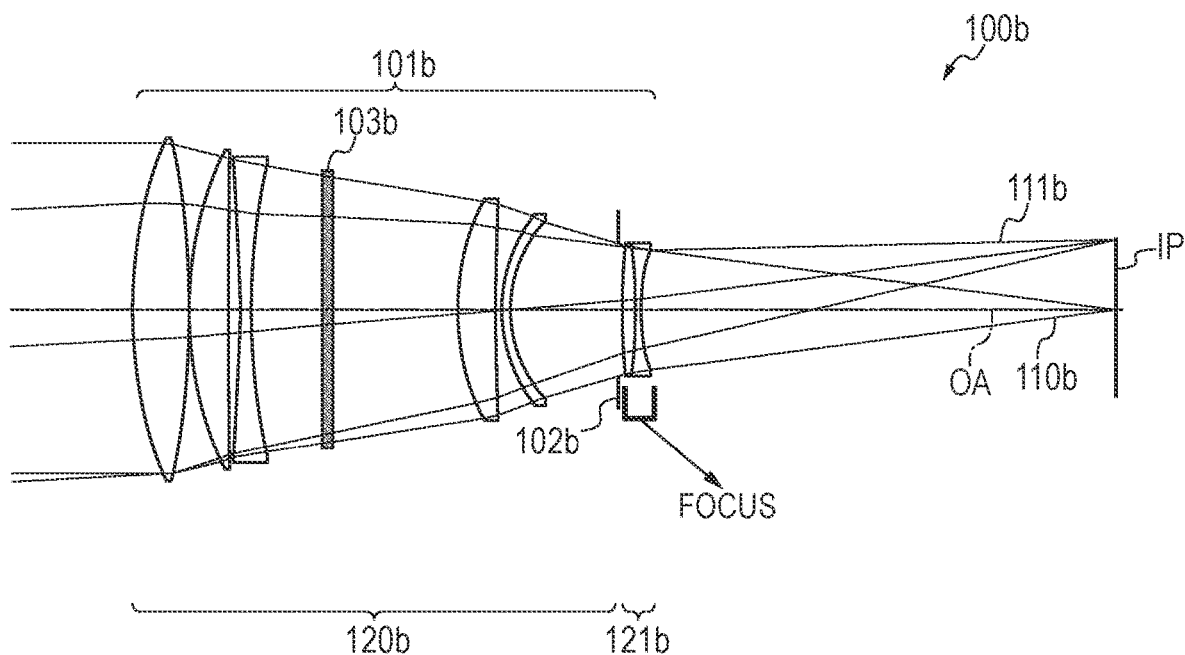
FIG. 11B is a cross-sectional view of the image pickup apparatus including the optical apparatus according to Example 2 of the aspect of the embodiments when focusing on an object at infinity.

FIG. 11B shows a cross-sectional view of an image pickup apparatus $100b$ including the optical apparatus according to Example 2 when focusing on an object at infinity.

As shown in FIG. 11B, the imaging optical system $101b$ includes a mechanical stop $102b$ and a distribution variable element $103b$.

The mechanical stop $102b$ and the distribution variable element $103b$ operate by receiving an input signal from a control unit (not shown).

In FIG. 11B, an axial light flux $110b$ and an outermost off-axis light flux $111b$ are also shown.

Further, the imaging optical system $101b$ has a two-unit structure including, in order from the object side to the image side, a first lens unit $120b$ having a positive refractive power and a second lens unit $121b$ having a negative refractive power.

In the imaging optical system $101b$, the mechanical stop $102b$ and the distribution variable element $103b$ are arranged such that a 13th surface is the mechanical stop $102b$, and 7th and 8th surfaces are an incident surface and an exit surface of the distribution variable element $103b$, respectively.

In the image pickup apparatus $100b$, focusing is performed by moving the second lens unit $121b$ having a negative refractive power to the image side.

In the image pickup apparatus $100b$, it is assumed that the transmittance distribution of the distribution variable element $103b$ is expressed by the expression (17).

When the mechanical stop $102b$ is opened to the maximum aperture, namely the aperture radius $r_{sp}$ is set to the maximum value $r_{spmax}$, the distribution of the entire system normalized transmittance T in the meridional cross sections of the axial light flux and the outermost off-axis light flux at the various coefficients α and β is shown in the following Tables 7 and 8, respectively.

TABLE 7

| | α | 7 | 0.4 | 0.6 | 0.3 | 0.7 | 0.5 | 0.55 | 0.26 | 0.6 | 0.7 |
|---|---|---|---|---|---|---|---|---|---|---|---|
| | β | 0.01 | 1 | 4 | 12 | 20 | 8 | 30 | 30 | 8 | 8 |
| $r_p$ | 0 | 1.00 | 1.00 | 1.00 | 1.00 | 1.00 | 1.00 | 1.00 | 1.00 | 1.00 | 1.00 |
| | 0.05 | 1.00 | 0.99 | 0.99 | 0.98 | 1.00 | 0.99 | 1.00 | 1.00 | 1.00 | 1.00 |
| | 0.1 | 1.00 | 0.97 | 0.97 | 0.96 | 1.00 | 0.98 | 1.00 | 0.99 | 0.99 | 1.00 |
| | 0.15 | 1.00 | 0.95 | 0.95 | 0.91 | 1.00 | 0.97 | 1.00 | 0.98 | 0.99 | 0.99 |
| | 0.2 | 1.00 | 0.94 | 0.93 | 0.82 | 1.00 | 0.95 | 1.00 | 0.91 | 0.98 | 0.99 |
| | 0.25 | 1.00 | 0.92 | 0.90 | 0.69 | 1.00 | 0.92 | 1.00 | 0.64 | 0.97 | 0.98 |
| | 0.3 | 1.00 | 0.90 | 0.87 | 0.55 | 1.00 | 0.88 | 1.00 | 0.31 | 0.95 | 0.98 |
| | 0.35 | 1.00 | 0.88 | 0.83 | 0.41 | 1.00 | 0.82 | 1.00 | 0.10 | 0.92 | 0.96 |
| | 0.4 | 1.00 | 0.86 | 0.78 | 0.28 | 1.00 | 0.73 | 1.00 | 0.02 | 0.88 | 0.95 |
| | 0.45 | 1.00 | 0.84 | 0.72 | 0.18 | 1.00 | 0.63 | 0.98 | 0.01 | 0.82 | 0.92 |
| | 0.5 | 1.00 | 0.82 | 0.67 | 0.11 | 0.99 | 0.55 | 0.91 | 0.00 | 0.73 | 0.88 |
| | 0.55 | 1.00 | 0.79 | 0.61 | 0.06 | 0.98 | 0.46 | 0.65 | 0.00 | 0.63 | 0.82 |
| | 0.6 | 1.00 | 0.77 | 0.56 | 0.04 | 0.94 | 0.35 | 0.31 | 0.00 | 0.55 | 0.73 |
| | 0.65 | 1.00 | 0.74 | 0.52 | 0.02 | 0.83 | 0.27 | 0.09 | 0.00 | 0.46 | 0.64 |
| | 0.7 | 1.00 | 0.72 | 0.47 | 0.01 | 0.61 | 0.20 | 0.02 | 0.00 | 0.35 | 0.55 |
| | 0.75 | 1.00 | 0.70 | 0.41 | 0.01 | 0.38 | 0.15 | 0.01 | 0.00 | 0.27 | 0.46 |
| | 0.8 | 1.00 | 0.67 | 0.36 | 0.00 | 0.19 | 0.10 | 0.00 | 0.00 | 0.20 | 0.35 |
| | 0.85 | 1.00 | 0.65 | 0.31 | 0.00 | 0.08 | 0.07 | 0.00 | 0.00 | 0.15 | 0.27 |
| | 0.9 | 1.00 | 0.63 | 0.27 | 0.00 | 0.03 | 0.05 | 0.00 | 0.00 | 0.10 | 0.20 |
| | 0.95 | 1.00 | 0.61 | 0.24 | 0.00 | 0.01 | 0.03 | 0.00 | 0.00 | 0.07 | 0.14 |
| | 1 | 1.00 | 0.59 | 0.20 | 0.00 | 0.00 | 0.02 | 0.00 | 0.00 | 0.05 | 0.10 |

TABLE 8

| | α | 7 | 0.4 | 0.6 | 0.3 | 0.7 | 0.5 | 0.55 | 0.26 | 0.6 | 0.7 |
|---|---|---|---|---|---|---|---|---|---|---|---|
| | β | 0.01 | 1 | 4 | 12 | 20 | 8 | 30 | 30 | 8 | 8 |
| $r_p$ | −1 | 1.00 | 0.72 | 0.47 | 0.01 | 0.61 | 0.20 | 0.02 | 0.00 | 0.35 | 0.55 |
| | −0.95 | 1.00 | 0.74 | 0.51 | 0.02 | 0.80 | 0.26 | 0.07 | 0.00 | 0.44 | 0.62 |
| | −0.9 | 1.00 | 0.76 | 0.55 | 0.03 | 0.91 | 0.32 | 0.21 | 0.00 | 0.52 | 0.70 |
| | −0.85 | 1.00 | 0.78 | 0.59 | 0.05 | 0.96 | 0.40 | 0.48 | 0.00 | 0.59 | 0.77 |

TABLE 8-continued

| α | 7 | 0.4 | 0.6 | 0.3 | 0.7 | 0.5 | 0.55 | 0.26 | 0.6 | 0.7 |
|---|---|---|---|---|---|---|---|---|---|---|
| β | 0.01 | 1 | 4 | 12 | 20 | 8 | 30 | 30 | 8 | 8 |
| −0.8 | 1.00 | 0.80 | 0.63 | 0.07 | 0.98 | 0.48 | 0.75 | 0.00 | 0.66 | 0.84 |
| −0.75 | 1.00 | 0.82 | 0.67 | 0.11 | 0.99 | 0.56 | 0.93 | 0.00 | 0.74 | 0.88 |
| −0.7 | 1.00 | 0.84 | 0.72 | 0.17 | 1.00 | 0.63 | 0.98 | 0.01 | 0.81 | 0.92 |
| −0.65 | 1.00 | 0.86 | 0.76 | 0.25 | 1.00 | 0.71 | 0.99 | 0.02 | 0.86 | 0.94 |
| −0.6 | 1.00 | 0.87 | 0.81 | 0.35 | 1.00 | 0.79 | 1.00 | 0.06 | 0.90 | 0.96 |
| −0.55 | 1.00 | 0.89 | 0.84 | 0.47 | 1.00 | 0.85 | 1.00 | 0.16 | 0.93 | 0.97 |
| −0.5 | 1.00 | 0.91 | 0.88 | 0.58 | 1.00 | 0.89 | 1.00 | 0.38 | 0.95 | 0.98 |
| −0.45 | 1.00 | 0.92 | 0.90 | 0.69 | 1.00 | 0.93 | 1.00 | 0.66 | 0.97 | 0.98 |
| −0.4 | 1.00 | 0.94 | 0.93 | 0.81 | 1.00 | 0.95 | 1.00 | 0.89 | 0.98 | 0.99 |
| −0.35 | 1.00 | 0.95 | 0.95 | 0.89 | 1.00 | 0.97 | 1.00 | 0.96 | 0.98 | 0.99 |
| −0.3 | 1.00 | 0.96 | 0.96 | 0.94 | 1.00 | 0.98 | 1.00 | 0.99 | 0.99 | 1.00 |
| −0.25 | 1.00 | 0.98 | 0.98 | 0.97 | 1.00 | 0.99 | 1.00 | 1.00 | 0.99 | 1.00 |
| −0.2 | 1.00 | 0.99 | 0.99 | 0.99 | 1.00 | 0.99 | 1.00 | 1.00 | 1.00 | 1.00 |
| −0.15 | 1.00 | 1.00 | 1.00 | 1.00 | 1.00 | 1.00 | 1.00 | 1.00 | 1.00 | 1.00 |
| −0.1 | 1.00 | 0.99 | 0.99 | 0.99 | 1.00 | 1.00 | 1.00 | 1.00 | 1.00 | 1.00 |
| −0.05 | 1.00 | 0.98 | 0.98 | 0.97 | 1.00 | 0.99 | 1.00 | 1.00 | 0.99 | 1.00 |
| 0 | 1.00 | 0.96 | 0.96 | 0.94 | 1.00 | 0.98 | 1.00 | 0.99 | 0.99 | 1.00 |
| 0.05 | 1.00 | 0.95 | 0.95 | 0.89 | 1.00 | 0.97 | 1.00 | 0.97 | 0.98 | 0.99 |
| 0.1 | 1.00 | 0.94 | 0.93 | 0.82 | 1.00 | 0.95 | 1.00 | 0.90 | 0.98 | 0.99 |
| 0.15 | 1.00 | 0.92 | 0.91 | 0.70 | 1.00 | 0.93 | 1.00 | 0.68 | 0.97 | 0.98 |
| 0.2 | 1.00 | 0.91 | 0.88 | 0.58 | 1.00 | 0.90 | 1.00 | 0.40 | 0.95 | 0.98 |
| 0.25 | 1.00 | 0.89 | 0.85 | 0.48 | 1.00 | 0.85 | 1.00 | 0.17 | 0.93 | 0.97 |
| 0.3 | 1.00 | 0.88 | 0.81 | 0.35 | 1.00 | 0.79 | 1.00 | 0.06 | 0.91 | 0.96 |
| 0.35 | 1.00 | 0.86 | 0.77 | 0.26 | 1.00 | 0.71 | 0.99 | 0.02 | 0.87 | 0.94 |
| 0.4 | 1.00 | 0.84 | 0.72 | 0.18 | 1.00 | 0.63 | 0.98 | 0.01 | 0.82 | 0.92 |
| 0.45 | 1.00 | 0.82 | 0.67 | 0.12 | 0.99 | 0.56 | 0.93 | 0.00 | 0.75 | 0.89 |
| 0.5 | 1.00 | 0.80 | 0.63 | 0.08 | 0.98 | 0.49 | 0.77 | 0.00 | 0.67 | 0.84 |
| 0.55 | 1.00 | 0.78 | 0.59 | 0.05 | 0.96 | 0.41 | 0.50 | 0.00 | 0.59 | 0.78 |
| 0.6 | 1.00 | 0.76 | 0.55 | 0.03 | 0.92 | 0.33 | 0.23 | 0.00 | 0.52 | 0.70 |
| 0.65 | 1.00 | 0.74 | 0.51 | 0.02 | 0.81 | 0.26 | 0.08 | 0.00 | 0.44 | 0.62 |
| 0.7 | 1.00 | 0.72 | 0.47 | 0.01 | 0.63 | 0.21 | 0.03 | 0.00 | 0.36 | 0.55 |
| 0.75 | 1.00 | 0.70 | 0.43 | 0.01 | 0.44 | 0.16 | 0.01 | 0.00 | 0.29 | 0.48 |
| 0.8 | 1.00 | 0.68 | 0.38 | 0.00 | 0.26 | 0.12 | 0.00 | 0.00 | 0.23 | 0.40 |
| 0.85 | 1.00 | 0.66 | 0.34 | 0.00 | 0.13 | 0.09 | 0.00 | 0.00 | 0.18 | 0.32 |
| 0.9 | 1.00 | 0.65 | 0.30 | 0.00 | 0.06 | 0.07 | 0.00 | 0.00 | 0.13 | 0.26 |
| 0.95 | 1.00 | 0.63 | 0.27 | 0.00 | 0.03 | 0.05 | 0.00 | 0.00 | 0.10 | 0.20 |
| 1 | 1.00 | 0.61 | 0.24 | 0.00 | 0.01 | 0.03 | 0.00 | 0.00 | 0.07 | 0.15 |

When the aperture radius $r_{sp}$ of the mechanical stop 102b is set to $0.7r_{spmax}$, the distribution of the entire system normalized transmittance T in the meridional cross sections of the axial light flux and the outermost off-axis light flux at the various coefficients α and β is shown in the following Tables 9 and 10, respectively.

TABLE 9

| | α | 7 | 0.4 | 0.6 | 0.3 | 0.7 | 0.5 | 0.55 | 0.26 | 0.45 | 0.45 | 0.45 | 0.45 |
|---|---|---|---|---|---|---|---|---|---|---|---|---|---|
| | β | 0.01 | 1 | 4 | 12 | 20 | 8 | 30 | 30 | 8 | 30 | 12 | 20 |
| $r_p$ | 0 | 1.00 | 1.00 | 1.00 | 1.00 | 1.00 | 1.00 | 1.00 | 1.00 | 1.00 | 1.00 | 1.00 | 1.00 |
| | 0.05 | 1.00 | 0.99 | 0.99 | 0.99 | 1.00 | 1.00 | 1.00 | 1.00 | 0.99 | 1.00 | 1.00 | 1.00 |
| | 0.1 | 1.00 | 0.98 | 0.98 | 0.97 | 1.00 | 0.99 | 1.00 | 1.00 | 0.99 | 1.00 | 1.00 | 1.00 |
| | 0.15 | 1.00 | 0.97 | 0.97 | 0.95 | 1.00 | 0.98 | 1.00 | 0.99 | 0.98 | 1.00 | 0.99 | 1.00 |
| | 0.2 | 1.00 | 0.96 | 0.96 | 0.92 | 1.00 | 0.97 | 1.00 | 0.98 | 0.96 | 1.00 | 0.99 | 1.00 |
| | 0.25 | 1.00 | 0.95 | 0.94 | 0.87 | 1.00 | 0.96 | 1.00 | 0.95 | 0.94 | 1.00 | 0.98 | 1.00 |
| | 0.3 | 1.00 | 0.93 | 0.92 | 0.79 | 1.00 | 0.95 | 1.00 | 0.87 | 0.92 | 1.00 | 0.97 | 0.99 |
| | 0.35 | 1.00 | 0.92 | 0.90 | 0.69 | 1.00 | 0.93 | 1.00 | 0.66 | 0.89 | 1.00 | 0.95 | 0.99 |
| | 0.4 | 1.00 | 0.91 | 0.88 | 0.59 | 1.00 | 0.90 | 1.00 | 0.42 | 0.85 | 1.00 | 0.92 | 0.98 |
| | 0.45 | 1.00 | 0.89 | 0.85 | 0.50 | 1.00 | 0.86 | 1.00 | 0.21 | 0.79 | 0.99 | 0.88 | 0.96 |
| | 0.5 | 1.00 | 0.88 | 0.82 | 0.40 | 1.00 | 0.81 | 1.00 | 0.09 | 0.73 | 0.97 | 0.81 | 0.92 |
| | 0.55 | 1.00 | 0.87 | 0.79 | 0.30 | 1.00 | 0.75 | 1.00 | 0.03 | 0.66 | 0.93 | 0.72 | 0.84 |
| | 0.6 | 1.00 | 0.85 | 0.75 | 0.22 | 1.00 | 0.68 | 0.99 | 0.01 | 0.59 | 0.80 | 0.62 | 0.70 |
| | 0.65 | 1.00 | 0.84 | 0.71 | 0.16 | 1.00 | 0.62 | 0.97 | 0.00 | 0.53 | 0.56 | 0.53 | 0.54 |
| | 0.7 | 1.00 | 0.82 | 0.67 | 0.11 | 0.99 | 0.55 | 0.92 | 0.00 | 0.47 | 0.32 | 0.43 | 0.37 |
| | 0.75 | 1.00 | 0.80 | 0.63 | 0.08 | 0.98 | 0.49 | 0.78 | 0.00 | 0.39 | 0.15 | 0.33 | 0.24 |
| | 0.8 | 1.00 | 0.79 | 0.59 | 0.05 | 0.97 | 0.42 | 0.54 | 0.00 | 0.33 | 0.06 | 0.25 | 0.13 |
| | 0.85 | 1.00 | 0.77 | 0.56 | 0.04 | 0.94 | 0.35 | 0.30 | 0.00 | 0.27 | 0.02 | 0.18 | 0.07 |
| | 0.9 | 1.00 | 0.75 | 0.53 | 0.02 | 0.87 | 0.29 | 0.13 | 0.00 | 0.22 | 0.01 | 0.12 | 0.04 |
| | 0.95 | 1.00 | 0.73 | 0.50 | 0.02 | 0.74 | 0.24 | 0.05 | 0.00 | 0.18 | 0.00 | 0.09 | 0.02 |
| | 1 | 1.00 | 0.72 | 0.46 | 0.01 | 0.58 | 0.19 | 0.02 | 0.00 | 0.14 | 0.00 | 0.06 | 0.01 |

TABLE 10

|  | α | 7 | 0.4 | 0.6 | 0.3 | 0.7 | 0.5 | 0.55 | 0.26 | 0.45 | 0.45 |
|---|---|---|---|---|---|---|---|---|---|---|---|
|  | β | 0.01 | 1 | 4 | 12 | 20 | 8 | 30 | 30 | 8 | 30 |
| $r_p$ | −1 | 1.00 | 0.85 | 0.73 | 0.19 | 1.00 | 0.65 | 0.98 | 0.01 | 0.56 | 0.69 |
|  | −0.95 | 1.00 | 0.86 | 0.77 | 0.26 | 1.00 | 0.72 | 0.99 | 0.02 | 0.63 | 0.88 |
|  | −0.9 | 1.00 | 0.88 | 0.81 | 0.34 | 1.00 | 0.78 | 1.00 | 0.05 | 0.69 | 0.96 |
|  | −0.85 | 1.00 | 0.89 | 0.84 | 0.45 | 1.00 | 0.84 | 1.00 | 0.13 | 0.76 | 0.98 |
|  | −0.8 | 1.00 | 0.90 | 0.87 | 0.54 | 1.00 | 0.88 | 1.00 | 0.29 | 0.82 | 0.99 |
|  | −0.75 | 1.00 | 0.92 | 0.89 | 0.64 | 1.00 | 0.91 | 1.00 | 0.53 | 0.87 | 1.00 |
|  | −0.7 | 1.00 | 0.93 | 0.91 | 0.74 | 1.00 | 0.94 | 1.00 | 0.76 | 0.90 | 1.00 |
|  | −0.65 | 1.00 | 0.94 | 0.93 | 0.83 | 1.00 | 0.95 | 1.00 | 0.91 | 0.93 | 1.00 |
|  | −0.6 | 1.00 | 0.95 | 0.95 | 0.89 | 1.00 | 0.97 | 1.00 | 0.97 | 0.95 | 1.00 |
|  | −0.55 | 1.00 | 0.96 | 0.96 | 0.94 | 1.00 | 0.98 | 1.00 | 0.99 | 0.97 | 1.00 |
|  | −0.5 | 1.00 | 0.97 | 0.98 | 0.96 | 1.00 | 0.99 | 1.00 | 1.00 | 0.98 | 1.00 |
|  | −0.45 | 1.00 | 0.99 | 0.99 | 0.98 | 1.00 | 0.99 | 1.00 | 1.00 | 0.99 | 1.00 |
|  | −0.4 | 1.00 | 1.00 | 1.00 | 1.00 | 1.00 | 1.00 | 1.00 | 1.00 | 1.00 | 1.00 |
|  | −0.35 | 1.00 | 1.00 | 1.00 | 1.00 | 1.00 | 1.00 | 1.00 | 1.00 | 1.00 | 1.00 |
|  | −0.3 | 1.00 | 0.99 | 0.99 | 0.99 | 1.00 | 1.00 | 1.00 | 1.00 | 0.99 | 1.00 |
|  | −0.25 | 1.00 | 0.98 | 0.98 | 0.97 | 1.00 | 0.99 | 1.00 | 1.00 | 0.98 | 1.00 |
|  | −0.2 | 1.00 | 0.97 | 0.97 | 0.95 | 1.00 | 0.98 | 1.00 | 0.99 | 0.97 | 1.00 |
|  | −0.15 | 1.00 | 0.96 | 0.96 | 0.91 | 1.00 | 0.97 | 1.00 | 0.98 | 0.96 | 1.00 |
|  | −0.1 | 1.00 | 0.95 | 0.94 | 0.86 | 1.00 | 0.96 | 1.00 | 0.94 | 0.94 | 1.00 |
|  | −0.05 | 1.00 | 0.93 | 0.92 | 0.78 | 1.00 | 0.94 | 1.00 | 0.84 | 0.92 | 1.00 |
|  | 0 | 1.00 | 0.92 | 0.90 | 0.68 | 1.00 | 0.92 | 1.00 | 0.62 | 0.89 | 1.00 |
|  | 0.05 | 1.00 | 0.91 | 0.88 | 0.58 | 1.00 | 0.90 | 1.00 | 0.39 | 0.84 | 1.00 |
|  | 0.1 | 1.00 | 0.90 | 0.85 | 0.49 | 1.00 | 0.86 | 1.00 | 0.19 | 0.79 | 0.99 |
|  | 0.15 | 1.00 | 0.88 | 0.82 | 0.39 | 1.00 | 0.81 | 1.00 | 0.08 | 0.72 | 0.97 |
|  | 0.2 | 1.00 | 0.87 | 0.79 | 0.30 | 1.00 | 0.75 | 1.00 | 0.03 | 0.65 | 0.92 |
|  | 0.25 | 1.00 | 0.85 | 0.75 | 0.22 | 1.00 | 0.68 | 0.99 | 0.01 | 0.59 | 0.79 |
|  | 0.3 | 1.00 | 0.84 | 0.71 | 0.16 | 1.00 | 0.61 | 0.97 | 0.00 | 0.53 | 0.56 |
|  | 0.35 | 1.00 | 0.82 | 0.67 | 0.11 | 0.99 | 0.55 | 0.92 | 0.00 | 0.47 | 0.32 |
|  | 0.4 | 1.00 | 0.80 | 0.63 | 0.08 | 0.98 | 0.49 | 0.78 | 0.00 | 0.39 | 0.15 |
|  | 0.45 | 1.00 | 0.79 | 0.60 | 0.05 | 0.97 | 0.43 | 0.55 | 0.00 | 0.33 | 0.06 |
|  | 0.5 | 1.00 | 0.77 | 0.56 | 0.04 | 0.94 | 0.35 | 0.31 | 0.00 | 0.27 | 0.02 |
|  | 0.55 | 1.00 | 0.75 | 0.53 | 0.02 | 0.88 | 0.30 | 0.14 | 0.00 | 0.22 | 0.01 |
|  | 0.6 | 1.00 | 0.74 | 0.50 | 0.02 | 0.76 | 0.25 | 0.06 | 0.00 | 0.18 | 0.00 |
|  | 0.65 | 1.00 | 0.72 | 0.46 | 0.01 | 0.59 | 0.20 | 0.02 | 0.00 | 0.14 | 0.00 |
|  | 0.7 | 1.00 | 0.70 | 0.43 | 0.01 | 0.44 | 0.16 | 0.01 | 0.00 | 0.11 | 0.00 |
|  | 0.75 | 1.00 | 0.69 | 0.39 | 0.00 | 0.28 | 0.12 | 0.00 | 0.00 | 0.09 | 0.00 |
|  | 0.8 | 1.00 | 0.67 | 0.35 | 0.00 | 0.16 | 0.10 | 0.00 | 0.00 | 0.07 | 0.00 |
|  | 0.85 | 1.00 | 0.66 | 0.32 | 0.00 | 0.09 | 0.08 | 0.00 | 0.00 | 0.05 | 0.00 |
|  | 0.9 | 1.00 | 0.64 | 0.29 | 0.00 | 0.05 | 0.06 | 0.00 | 0.00 | 0.04 | 0.00 |
|  | 0.95 | 1.00 | 0.63 | 0.26 | 0.00 | 0.02 | 0.04 | 0.00 | 0.00 | 0.03 | 0.00 |
|  | 1 | 1.00 | 0.61 | 0.24 | 0.00 | 0.01 | 0.03 | 0.00 | 0.00 | 0.02 | 0.00 |

|  | α | 0.45 | 0.45 |
|---|---|---|---|
|  | β | 12 | 20 |
| $r_p$ | −1 | 0.58 | 0.62 |
|  | −0.95 | 0.67 | 0.78 |
|  | −0.9 | 0.77 | 0.89 |
|  | −0.85 | 0.84 | 0.94 |
|  | −0.8 | 0.90 | 0.97 |
|  | −0.75 | 0.93 | 0.98 |
|  | −0.7 | 0.96 | 0.99 |
|  | −0.65 | 0.97 | 1.00 |
|  | −0.6 | 0.98 | 1.00 |
|  | −0.55 | 0.99 | 1.00 |
|  | −0.5 | 0.99 | 1.00 |
|  | −0.45 | 1.00 | 1.00 |
|  | −0.4 | 1.00 | 1.00 |
|  | −0.35 | 1.00 | 1.00 |
|  | −0.3 | 1.00 | 1.00 |
|  | −0.25 | 1.00 | 1.00 |
|  | −0.2 | 0.99 | 1.00 |
|  | −0.15 | 0.99 | 1.00 |
|  | −0.1 | 0.98 | 1.00 |
|  | −0.05 | 0.96 | 0.99 |
|  | 0 | 0.94 | 0.99 |
|  | 0.05 | 0.91 | 0.98 |
|  | 0.1 | 0.87 | 0.96 |
|  | 0.15 | 0.80 | 0.92 |
|  | 0.2 | 0.71 | 0.84 |
|  | 0.25 | 0.61 | 0.69 |
|  | 0.3 | 0.53 | 0.54 |
|  | 0.35 | 0.43 | 0.37 |
|  | 0.4 | 0.33 | 0.24 |
|  | 0.45 | 0.25 | 0.14 |
|  | 0.5 | 0.18 | 0.07 |
|  | 0.55 | 0.13 | 0.04 |

TABLE 10-continued

| | | |
|---|---|---|
| 0.6 | 0.09 | 0.02 |
| 0.65 | 0.06 | 0.01 |
| 0.7 | 0.04 | 0.01 |
| 0.75 | 0.03 | 0.00 |
| 0.8 | 0.02 | 0.00 |
| 0.85 | 0.01 | 0.00 |
| 0.9 | 0.01 | 0.00 |
| 0.95 | 0.01 | 0.00 |
| 1 | 0.00 | 0.00 |

Note that values of the coefficients α and β described in Tables 7 to 10 are examples, and the aspect of the embodiments is not limited thereto. The coefficients α and β can take various values in the image pickup apparatus 100b.

Example 3

Figure 12A:
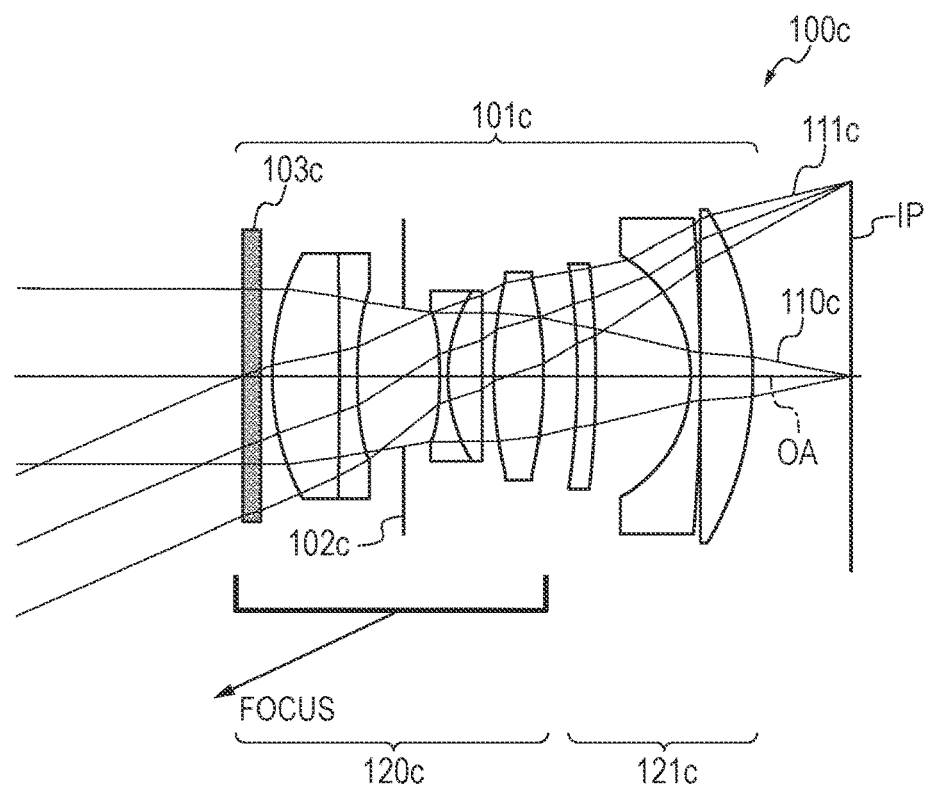
FIG. 12A is a cross-sectional view of the image pickup apparatus including the optical apparatus according to Example 3 of the aspect of the embodiments when focusing on an object at infinity.

FIG. 12A shows a cross-sectional view of an image pickup apparatus 100c including the optical apparatus according to Example 3 when focusing on an object at infinity.

As shown in FIG. 12A, the imaging optical system 101c includes a mechanical stop 102c and a distribution variable element 103c.

The mechanical stop 102c and the distribution variable element 103c operate by receiving an input signal from a control unit (not shown).

In FIG. 12A, an axial light flux 110c and an outermost off-axis light flux 111c are also shown.

Further, the imaging optical system 101c has a two-unit structure including, in order from the object side to the image side, a first lens unit 120c having a positive refractive power and a second lens unit 121c having a negative refractive power.

In the imaging optical system 101c, the mechanical stop 102c and the distribution variable element 103c are arranged such that a 6th surface is the mechanical stop 102c, and 1st and 2nd surfaces are an incident surface and an exit surface of the distribution variable element 103c, respectively.

In the image pickup apparatus 100c, focusing is performed by moving the first lens unit 120c having a positive refractive power to the object side.

In the image pickup apparatus 100c, it is assumed that the transmittance distribution of the distribution variable element 103c is expressed by the expression (11).

When the mechanical stop 102c is opened to the maximum aperture, namely the aperture radius $r_{sp}$ is set to the maximum value $r_{spmax}$, the distribution of the entire system normalized transmittance T in the meridional cross sections of the axial light flux and the outermost off-axis light flux at the various coefficients A and B is shown in the following Tables 11 and 12, respectively.

TABLE 11

| | A | 1.1 | 1.1 | 2 | 4 | 8.5 |
|---|---|---|---|---|---|---|
| | B | 100000 | 2.4 | 2 | 2 | 2 |
| $r_p$ | 0 | 1.00 | 1.00 | 1.00 | 1.00 | 1.00 |
| | 0.05 | 1.00 | 1.00 | 1.00 | 1.00 | 0.99 |
| | 0.1 | 1.00 | 1.00 | 0.99 | 0.99 | 0.97 |
| | 0.15 | 1.00 | 0.99 | 0.98 | 0.97 | 0.93 |
| | 0.2 | 1.00 | 0.99 | 0.97 | 0.94 | 0.87 |
| | 0.25 | 1.00 | 0.98 | 0.95 | 0.90 | 0.78 |
| | 0.3 | 1.00 | 0.97 | 0.93 | 0.86 | 0.68 |
| | 0.35 | 1.00 | 0.96 | 0.90 | 0.80 | 0.59 |
| | 0.4 | 1.00 | 0.95 | 0.87 | 0.73 | 0.51 |

TABLE 11-continued

| A | 1.1 | 1.1 | 2 | 4 | 8.5 |
|---|---|---|---|---|---|
| B | 100000 | 2.4 | 2 | 2 | 2 |
| 0.45 | 1.00 | 0.94 | 0.83 | 0.65 | 0.42 |
| 0.5 | 1.00 | 0.93 | 0.79 | 0.59 | 0.34 |
| 0.55 | 1.00 | 0.91 | 0.73 | 0.54 | 0.27 |
| 0.6 | 1.00 | 0.89 | 0.68 | 0.48 | 0.21 |
| 0.65 | 1.00 | 0.87 | 0.63 | 0.41 | 0.15 |
| 0.7 | 1.00 | 0.84 | 0.58 | 0.35 | 0.11 |
| 0.75 | 1.00 | 0.81 | 0.54 | 0.30 | 0.08 |
| 0.8 | 1.00 | 0.78 | 0.50 | 0.25 | 0.05 |
| 0.85 | 1.00 | 0.75 | 0.45 | 0.20 | 0.03 |
| 0.9 | 1.00 | 0.71 | 0.40 | 0.16 | 0.02 |
| 0.95 | 1.00 | 0.68 | 0.35 | 0.12 | 0.01 |
| 1 | 1.00 | 0.64 | 0.30 | 0.09 | 0.01 |

TABLE 12

| | A | 1.1 | 1.1 | 2 | 4 | 8.5 |
|---|---|---|---|---|---|---|
| | B | 100000 | 2.4 | 2 | 2 | 2 |
| $r_p$ | −1 | 1.00 | 1.00 | 1.00 | 1.00 | 1.00 |
| | −0.95 | 1.00 | 1.00 | 1.00 | 1.00 | 1.00 |
| | −0.9 | 1.00 | 1.00 | 1.00 | 1.00 | 0.99 |
| | −0.85 | 1.00 | 1.00 | 0.99 | 0.99 | 0.97 |
| | −0.8 | 1.00 | 0.99 | 0.99 | 0.97 | 0.94 |
| | −0.75 | 1.00 | 0.99 | 0.98 | 0.95 | 0.90 |
| | −0.7 | 1.00 | 0.99 | 0.97 | 0.93 | 0.85 |
| | −0.65 | 1.00 | 0.98 | 0.95 | 0.90 | 0.77 |
| | −0.6 | 1.00 | 0.98 | 0.93 | 0.86 | 0.69 |
| | −0.55 | 1.00 | 0.97 | 0.91 | 0.82 | 0.61 |
| | −0.5 | 1.00 | 0.96 | 0.89 | 0.76 | 0.54 |
| | −0.45 | 1.00 | 0.95 | 0.86 | 0.70 | 0.48 |
| | −0.4 | 1.00 | 0.94 | 0.83 | 0.65 | 0.41 |
| | −0.35 | 1.00 | 0.93 | 0.79 | 0.59 | 0.34 |
| | −0.3 | 1.00 | 0.91 | 0.75 | 0.55 | 0.28 |
| | −0.25 | 1.00 | 0.90 | 0.71 | 0.50 | 0.23 |
| | −0.2 | 1.00 | 0.88 | 0.67 | 0.46 | 0.19 |
| | −0.15 | 1.00 | 0.87 | 0.62 | 0.40 | 0.15 |
| | −0.1 | 1.00 | 0.85 | 0.59 | 0.35 | 0.11 |
| | −0.05 | 1.00 | 0.82 | 0.55 | 0.31 | 0.08 |
| | 0 | 1.00 | 0.80 | 0.52 | 0.27 | 0.06 |
| | 0.05 | 1.00 | 0.77 | 0.48 | 0.23 | 0.04 |
| | 0.1 | 1.00 | 0.75 | 0.44 | 0.19 | 0.03 |
| | 0.15 | 1.00 | 0.72 | 0.40 | 0.16 | 0.02 |
| | 0.2 | 1.00 | 0.69 | 0.36 | 0.13 | 0.01 |
| | 0.25 | 1.00 | 0.66 | 0.32 | 0.10 | 0.01 |
| | 0.3 | 1.00 | 0.63 | 0.29 | 0.08 | 0.00 |
| | 0.35 | 1.00 | 0.60 | 0.25 | 0.06 | 0.00 |
| | 0.4 | 1.00 | 0.58 | 0.22 | 0.05 | 0.00 |
| | 0.45 | 1.00 | 0.55 | 0.19 | 0.04 | 0.00 |
| | 0.5 | 1.00 | 0.53 | 0.16 | 0.02 | 0.00 |
| | 0.55 | 1.00 | 0.51 | 0.13 | 0.02 | 0.00 |
| | 0.6 | 1.00 | 0.48 | 0.10 | 0.01 | 0.00 |
| | 0.65 | 1.00 | 0.45 | 0.08 | 0.01 | 0.00 |
| | 0.7 | 1.00 | 0.42 | 0.06 | 0.00 | 0.00 |
| | 0.75 | 1.00 | 0.39 | 0.04 | 0.00 | 0.00 |
| | 0.8 | 1.00 | 0.35 | 0.03 | 0.00 | 0.00 |
| | 0.85 | 1.00 | 0.32 | 0.02 | 0.00 | 0.00 |
| | 0.9 | 1.00 | 0.29 | 0.01 | 0.00 | 0.00 |
| | 0.95 | 1.00 | 0.27 | 0.00 | 0.00 | 0.00 |
| | 1 | 1.00 | 0.24 | 0.00 | 0.00 | 0.00 |

When the aperture radius $r_{sp}$ of the mechanical stop 102c is set to $0.7r_{spmax}$, the distribution of the entire system normalized transmittance T in the meridional cross sections of the axial light flux and the outermost off-axis light flux at the various coefficients A and B is shown in the following Tables 13 and 14, respectively.

TABLE 13

| | A | 1.1 | 1.1 | 1.1 | 2 | 4 | 8.5 | 12 | 20 |
|---|---|---|---|---|---|---|---|---|---|
| | B | 100000 | 4 | 2.4 | 2 | 2 | 2 | 2 | 2 |
| $r_p$ | 0 | 1.00 | 1.00 | 1.00 | 1.00 | 1.00 | 1.00 | 1.00 | 1.00 |
| | 0.05 | 1.00 | 1.00 | 1.00 | 1.00 | 1.00 | 1.00 | 0.99 | 0.99 |
| | 0.1 | 1.00 | 1.00 | 1.00 | 1.00 | 0.99 | 0.98 | 0.98 | 0.96 |
| | 0.15 | 1.00 | 1.00 | 1.00 | 0.99 | 0.98 | 0.96 | 0.95 | 0.91 |
| | 0.2 | 1.00 | 1.00 | 0.99 | 0.99 | 0.97 | 0.94 | 0.91 | 0.84 |
| | 0.25 | 1.00 | 1.00 | 0.99 | 0.98 | 0.95 | 0.90 | 0.85 | 0.74 |
| | 0.3 | 1.00 | 1.00 | 0.99 | 0.97 | 0.93 | 0.85 | 0.78 | 0.63 |
| | 0.35 | 1.00 | 0.99 | 0.98 | 0.95 | 0.91 | 0.78 | 0.69 | 0.54 |
| | 0.4 | 1.00 | 0.99 | 0.98 | 0.94 | 0.87 | 0.71 | 0.61 | 0.46 |
| | 0.45 | 1.00 | 0.99 | 0.97 | 0.92 | 0.84 | 0.64 | 0.54 | 0.37 |
| | 0.5 | 1.00 | 0.99 | 0.96 | 0.90 | 0.79 | 0.58 | 0.48 | 0.29 |
| | 0.55 | 1.00 | 0.98 | 0.96 | 0.88 | 0.74 | 0.53 | 0.41 | 0.22 |
| | 0.6 | 1.00 | 0.98 | 0.95 | 0.85 | 0.69 | 0.47 | 0.34 | 0.17 |
| | 0.65 | 1.00 | 0.98 | 0.94 | 0.82 | 0.64 | 0.41 | 0.28 | 0.12 |
| | 0.7 | 1.00 | 0.97 | 0.93 | 0.79 | 0.60 | 0.35 | 0.23 | 0.08 |
| | 0.75 | 1.00 | 0.97 | 0.92 | 0.76 | 0.56 | 0.30 | 0.18 | 0.06 |
| | 0.8 | 1.00 | 0.97 | 0.90 | 0.72 | 0.52 | 0.25 | 0.14 | 0.04 |
| | 0.85 | 1.00 | 0.96 | 0.89 | 0.68 | 0.48 | 0.21 | 0.11 | 0.02 |
| | 0.9 | 1.00 | 0.96 | 0.87 | 0.65 | 0.43 | 0.17 | 0.08 | 0.02 |
| | 0.95 | 1.00 | 0.95 | 0.86 | 0.61 | 0.39 | 0.13 | 0.06 | 0.01 |
| | 1 | 1.00 | 0.95 | 0.84 | 0.58 | 0.34 | 0.11 | 0.04 | 0.01 |

TABLE 14

| | A | 1.1 | 1.1 | 1.1 | 2 | 4 | 8.5 | 12 | 20 |
|---|---|---|---|---|---|---|---|---|---|
| | B | 100000 | 4 | 2.4 | 2 | 2 | 2 | 2 | 2 |
| $r_p$ | −1 | 1.00 | 1.00 | 1.00 | 1.00 | 1.00 | 1.00 | 1.00 | 1.00 |
| | −0.95 | 1.00 | 1.00 | 1.00 | 1.00 | 1.00 | 0.99 | 0.99 | 0.98 |
| | −0.9 | 1.00 | 1.00 | 1.00 | 0.99 | 0.99 | 0.98 | 0.97 | 0.94 |
| | −0.85 | 1.00 | 1.00 | 1.00 | 0.99 | 0.98 | 0.95 | 0.93 | 0.88 |
| | −0.8 | 1.00 | 1.00 | 0.99 | 0.98 | 0.96 | 0.92 | 0.88 | 0.79 |
| | −0.75 | 1.00 | 1.00 | 0.99 | 0.97 | 0.94 | 0.87 | 0.81 | 0.68 |
| | −0.7 | 1.00 | 0.99 | 0.98 | 0.96 | 0.92 | 0.81 | 0.72 | 0.57 |
| | −0.65 | 1.00 | 0.99 | 0.98 | 0.94 | 0.89 | 0.74 | 0.64 | 0.48 |
| | −0.6 | 1.00 | 0.99 | 0.97 | 0.93 | 0.85 | 0.66 | 0.56 | 0.39 |
| | −0.55 | 1.00 | 0.99 | 0.97 | 0.91 | 0.80 | 0.59 | 0.49 | 0.30 |
| | −0.5 | 1.00 | 0.98 | 0.96 | 0.89 | 0.75 | 0.53 | 0.42 | 0.23 |
| | −0.45 | 1.00 | 0.98 | 0.95 | 0.86 | 0.70 | 0.47 | 0.34 | 0.17 |
| | −0.4 | 1.00 | 0.98 | 0.94 | 0.83 | 0.65 | 0.41 | 0.28 | 0.12 |
| | −0.35 | 1.00 | 0.97 | 0.93 | 0.79 | 0.60 | 0.34 | 0.23 | 0.08 |
| | −0.3 | 1.00 | 0.97 | 0.92 | 0.76 | 0.55 | 0.29 | 0.18 | 0.06 |
| | −0.25 | 1.00 | 0.97 | 0.90 | 0.72 | 0.51 | 0.24 | 0.14 | 0.04 |
| | −0.2 | 1.00 | 0.96 | 0.89 | 0.68 | 0.47 | 0.20 | 0.10 | 0.02 |
| | −0.15 | 1.00 | 0.96 | 0.87 | 0.64 | 0.42 | 0.16 | 0.07 | 0.01 |
| | −0.1 | 1.00 | 0.95 | 0.86 | 0.60 | 0.38 | 0.13 | 0.05 | 0.01 |
| | −0.05 | 1.00 | 0.95 | 0.84 | 0.57 | 0.33 | 0.10 | 0.04 | 0.00 |
| | 0 | 1.00 | 0.94 | 0.81 | 0.54 | 0.29 | 0.07 | 0.03 | 0.00 |
| | 0.05 | 1.00 | 0.93 | 0.79 | 0.51 | 0.26 | 0.06 | 0.02 | 0.00 |
| | 0.1 | 1.00 | 0.93 | 0.77 | 0.47 | 0.22 | 0.04 | 0.01 | 0.00 |
| | 0.15 | 1.00 | 0.92 | 0.74 | 0.44 | 0.19 | 0.03 | 0.01 | 0.00 |
| | 0.2 | 1.00 | 0.91 | 0.72 | 0.40 | 0.16 | 0.02 | 0.00 | 0.00 |
| | 0.25 | 1.00 | 0.91 | 0.69 | 0.36 | 0.13 | 0.01 | 0.00 | 0.00 |
| | 0.3 | 1.00 | 0.90 | 0.66 | 0.32 | 0.11 | 0.01 | 0.00 | 0.00 |
| | 0.35 | 1.00 | 0.89 | 0.64 | 0.29 | 0.09 | 0.01 | 0.00 | 0.00 |
| | 0.4 | 1.00 | 0.88 | 0.61 | 0.26 | 0.07 | 0.00 | 0.00 | 0.00 |
| | 0.45 | 1.00 | 0.87 | 0.59 | 0.23 | 0.05 | 0.00 | 0.00 | 0.00 |
| | 0.5 | 1.00 | 0.86 | 0.56 | 0.20 | 0.04 | 0.00 | 0.00 | 0.00 |
| | 0.55 | 1.00 | 0.85 | 0.54 | 0.17 | 0.03 | 0.00 | 0.00 | 0.00 |
| | 0.6 | 1.00 | 0.83 | 0.52 | 0.15 | 0.02 | 0.00 | 0.00 | 0.00 |
| | 0.65 | 1.00 | 0.82 | 0.50 | 0.12 | 0.01 | 0.00 | 0.00 | 0.00 |
| | 0.7 | 1.00 | 0.81 | 0.47 | 0.10 | 0.01 | 0.00 | 0.00 | 0.00 |
| | 0.75 | 1.00 | 0.80 | 0.45 | 0.08 | 0.01 | 0.00 | 0.00 | 0.00 |
| | 0.8 | 1.00 | 0.78 | 0.42 | 0.06 | 0.00 | 0.00 | 0.00 | 0.00 |
| | 0.85 | 1.00 | 0.77 | 0.39 | 0.04 | 0.00 | 0.00 | 0.00 | 0.00 |
| | 0.9 | 1.00 | 0.75 | 0.36 | 0.03 | 0.00 | 0.00 | 0.00 | 0.00 |

TABLE 14-continued

| A | 1.1 | 1.1 | 1.1 | 2 | 4 | 8.5 | 12 | 20 |
|---|---|---|---|---|---|---|---|---|
| B | 100000 | 4 | 2.4 | 2 | 2 | 2 | 2 | 2 |
| 0.95 | 1.00 | 0.74 | 0.33 | 0.02 | 0.00 | 0.00 | 0.00 | 0.00 |
| 1 | 1.00 | 0.72 | 0.30 | 0.01 | 0.00 | 0.00 | 0.00 | 0.00 |

Note that values of the coefficients A and B described in Tables 11 to 14 are examples, and the aspect of the embodiments is not limited thereto. The coefficients A and B can take various values in the image pickup apparatus 100c.

Example 4

Figure 12B:
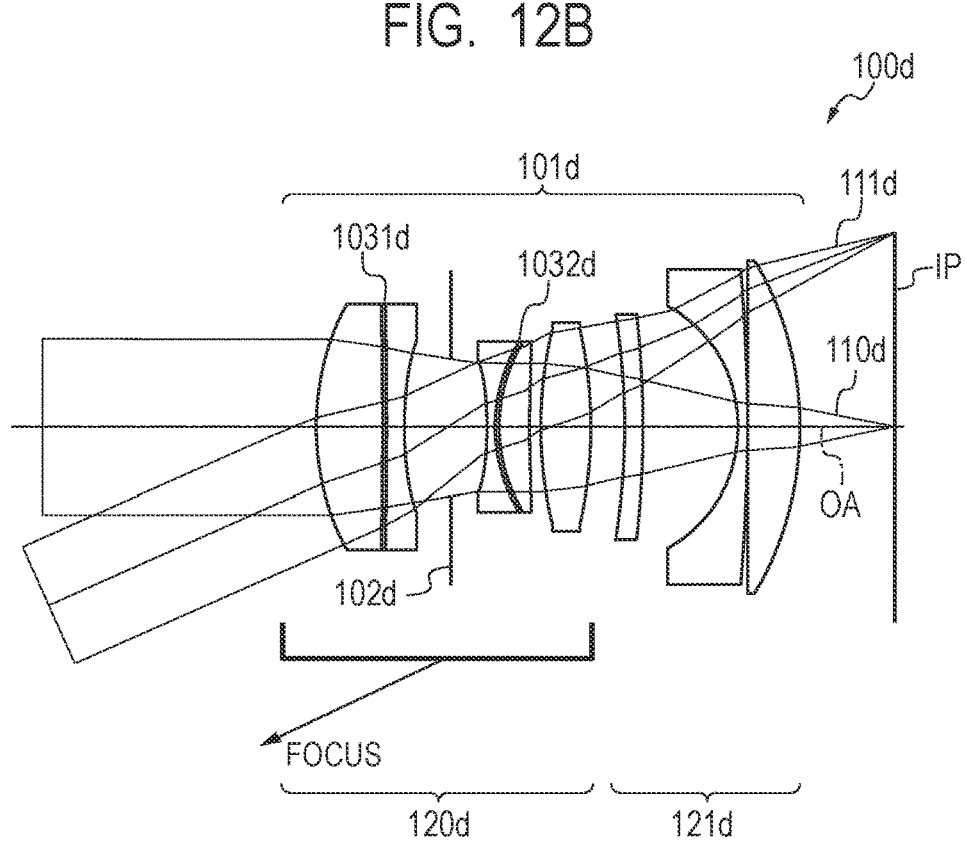
FIG. 12B is a cross-sectional view of the image pickup apparatus including the optical apparatus according to Example 4 of the aspect of the embodiments when focusing on an object at infinity.

FIG. 12B shows a cross-sectional view of an image pickup apparatus 100d including the optical apparatus according to Example 4 when focusing on an object at infinity.

As shown in FIG. 12B, the imaging optical system 101d includes a mechanical stop 102d, a first distribution variable element 1031d and a second distribution variable element 1032d.

The mechanical stop 102d, the first distribution variable element 1031d and the second distribution variable element 1032d operate by receiving an input signal from a control unit (not shown).

In FIG. 12B, an axial light flux 110d and an outermost off-axis light flux 111d are also shown.

Further, the imaging optical system 101d has a two-unit structure including, in order from the object side to the image side, a first lens unit 120d having a positive refractive power and a second lens unit 121d having a negative refractive power.

In the imaging optical system 101d, a 5th surface is the mechanical stop 102d, 2nd and 3rd surfaces are an incident surface and an exit surface of the first distribution variable element 1031d, respectively, and 7th and 8th surfaces are an incident surface and an exit surface of the second distribution variable element 1032d, respectively, namely the mechanical stop 102d is arranged between the first distribution variable element 1031d and the second distribution variable element 1032d.

In the image pickup apparatus 100d, focusing is performed by moving the first lens unit 120d having a positive refractive power to the object side.

In the image pickup apparatus 100d, it is assumed that respective transmittance distributions of the first distribution variable element 1031d and the second distribution variable element 1032d are expressed by the expression (17).

When the mechanical stop 102d is opened to the maximum aperture, namely the aperture radius $r_{sp}$ is set to the maximum value $r_{spmax}$, the distribution of the entire system normalized transmittance T in the meridional cross sections of the axial light flux and the outermost off-axis light flux at the various coefficients α and β is shown in the following Tables 15 and 16, respectively.

TABLE 15

| 1031d | α | 0.5 | 0.5 | 0.7 | 0.7 | 0.7 | 0.4 | 0.7 | 0.4 |
|---|---|---|---|---|---|---|---|---|---|
| | β | 8 | 8 | 0.01 | 0.01 | 8 | 1 | 0.01 | 1 |
| 1032d | α | 0.7 | 0.5 | 0.7 | 0.5 | 0.7 | 0.4 | 0.4 | 0.7 |
| | β | 0.01 | 8 | 0.01 | 8 | 8 | 1 | 1 | 10 |
| $r_p$ | 0 | 1.00 | 1.00 | 1.00 | 1.00 | 1.00 | 1.00 | 1.00 | 1.00 |
| | 0.05 | 0.99 | 0.99 | 1.00 | 0.99 | 1.00 | 0.98 | 0.99 | 0.99 |
| | 0.1 | 0.99 | 0.98 | 1.00 | 0.99 | 1.00 | 0.95 | 0.98 | 0.98 |

TABLE 15-continued

| | | | | | | | | | |
|---|---|---|---|---|---|---|---|---|---|
| 1031d | α | 0.5 | 0.5 | 0.7 | 0.7 | 0.7 | 0.4 | 0.7 | 0.4 |
| | β | 8 | 8 | 0.01 | 0.01 | 8 | 1 | 0.01 | 1 |
| 1032d | α | 0.7 | 0.5 | 0.7 | 0.5 | 0.7 | 0.4 | 0.4 | 0.7 |
| | β | 0.01 | 8 | 0.01 | 8 | 8 | 1 | 1 | 10 |
| | 0.15 | 0.98 | 0.96 | 1.00 | 0.98 | 0.99 | 0.93 | 0.96 | 0.96 |
| | 0.2 | 0.97 | 0.94 | 1.00 | 0.97 | 0.99 | 0.90 | 0.95 | 0.95 |
| | 0.25 | 0.95 | 0.91 | 1.00 | 0.95 | 0.98 | 0.88 | 0.94 | 0.93 |
| | 0.3 | 0.93 | 0.86 | 1.00 | 0.93 | 0.97 | 0.85 | 0.92 | 0.92 |
| | 0.35 | 0.90 | 0.81 | 1.00 | 0.89 | 0.96 | 0.83 | 0.91 | 0.90 |
| | 0.4 | 0.86 | 0.73 | 1.00 | 0.85 | 0.94 | 0.80 | 0.89 | 0.88 |
| | 0.45 | 0.81 | 0.64 | 1.00 | 0.79 | 0.92 | 0.77 | 0.87 | 0.86 |
| | 0.5 | 0.74 | 0.53 | 1.00 | 0.71 | 0.89 | 0.74 | 0.86 | 0.83 |
| | 0.55 | 0.66 | 0.42 | 1.00 | 0.63 | 0.85 | 0.71 | 0.84 | 0.80 |
| | 0.6 | 0.59 | 0.33 | 1.00 | 0.55 | 0.79 | 0.68 | 0.82 | 0.77 |
| | 0.65 | 0.52 | 0.25 | 0.99 | 0.48 | 0.72 | 0.65 | 0.80 | 0.72 |
| | 0.7 | 0.45 | 0.18 | 0.99 | 0.39 | 0.63 | 0.62 | 0.78 | 0.66 |
| | 0.75 | 0.36 | 0.11 | 0.99 | 0.31 | 0.52 | 0.58 | 0.76 | 0.57 |
| | 0.8 | 0.29 | 0.07 | 0.99 | 0.25 | 0.41 | 0.55 | 0.74 | 0.48 |
| | 0.85 | 0.23 | 0.04 | 0.99 | 0.19 | 0.31 | 0.52 | 0.71 | 0.40 |
| | 0.9 | 0.18 | 0.03 | 0.99 | 0.14 | 0.24 | 0.49 | 0.69 | 0.32 |
| | 0.95 | 0.14 | 0.01 | 0.99 | 0.10 | 0.16 | 0.47 | 0.67 | 0.23 |
| | 1 | 0.102 | 0.01 | 0.99 | 0.07 | 0.102 | 0.44 | 0.65 | 0.17 |

TABLE 16

| | | | | | | | | | |
|---|---|---|---|---|---|---|---|---|---|
| 1031d | α | 0.5 | 0.5 | 0.7 | 0.7 | 0.7 | 0.4 | 0.7 | 0.4 |
| | β | 8 | 8 | 0.01 | 0.01 | 8 | 1 | 0.01 | 1 |
| 1032d | α | 0.7 | 0.5 | 0.7 | 0.5 | 0.7 | 0.4 | 0.4 | 0.7 |
| | β | 0.01 | 8 | 0.01 | 8 | 8 | 1 | 1 | 10 |
| $r_p$ | −1 | 0.91 | 0.01 | 0.94 | 0.01 | 0.06 | 0.64 | 0.00 | 0.03 |
| | −0.95 | 0.93 | 0.02 | 0.95 | 0.01 | 0.09 | 0.68 | 0.00 | 0.05 |
| | −0.9 | 0.95 | 0.03 | 0.96 | 0.02 | 0.11 | 0.71 | 0.01 | 0.07 |
| | −0.85 | 0.96 | 0.04 | 0.96 | 0.03 | 0.15 | 0.74 | 0.01 | 0.11 |
| | −0.8 | 0.97 | 0.06 | 0.97 | 0.03 | 0.19 | 0.78 | 0.03 | 0.15 |
| | −0.75 | 0.98 | 0.08 | 0.97 | 0.05 | 0.24 | 0.81 | 0.06 | 0.21 |
| | −0.7 | 0.99 | 0.11 | 0.97 | 0.06 | 0.31 | 0.84 | 0.11 | 0.28 |
| | −0.65 | 1.00 | 0.14 | 0.98 | 0.09 | 0.38 | 0.87 | 0.20 | 0.37 |
| | −0.6 | 1.00 | 0.19 | 0.98 | 0.11 | 0.45 | 0.90 | 0.35 | 0.47 |
| | −0.55 | 1.00 | 0.24 | 0.98 | 0.14 | 0.52 | 0.91 | 0.49 | 0.55 |
| | −0.5 | 1.00 | 0.30 | 0.98 | 0.18 | 0.59 | 0.93 | 0.67 | 0.64 |
| | −0.45 | 0.99 | 0.37 | 0.99 | 0.22 | 0.67 | 0.94 | 0.82 | 0.74 |
| | −0.4 | 0.98 | 0.45 | 0.99 | 0.28 | 0.75 | 0.95 | 0.90 | 0.83 |
| | −0.35 | 0.97 | 0.55 | 0.99 | 0.34 | 0.82 | 0.96 | 0.94 | 0.90 |
| | −0.3 | 0.96 | 0.65 | 0.99 | 0.41 | 0.88 | 0.97 | 0.96 | 0.94 |
| | −0.25 | 0.95 | 0.73 | 0.99 | 0.47 | 0.92 | 0.98 | 0.98 | 0.97 |
| | −0.2 | 0.93 | 0.80 | 0.99 | 0.53 | 0.95 | 0.99 | 0.99 | 0.99 |
| | −0.15 | 0.90 | 0.88 | 0.99 | 0.59 | 0.98 | 0.99 | 0.99 | 1.00 |
| | −0.1 | 0.87 | 0.95 | 0.99 | 0.67 | 0.99 | 1.00 | 0.99 | 1.00 |
| | −0.05 | 0.82 | 0.99 | 1.00 | 0.74 | 1.00 | 1.00 | 1.00 | 1.00 |
| | 0 | 0.77 | 1.00 | 1.00 | 0.80 | 1.00 | 1.00 | 1.00 | 0.99 |
| | 0.05 | 0.71 | 0.97 | 1.00 | 0.84 | 1.00 | 1.00 | 1.00 | 0.98 |
| | 0.1 | 0.64 | 0.92 | 1.00 | 0.88 | 0.99 | 1.00 | 1.00 | 0.97 |
| | 0.15 | 0.58 | 0.86 | 1.00 | 0.91 | 0.97 | 0.99 | 1.00 | 0.96 |
| | 0.2 | 0.52 | 0.79 | 1.00 | 0.93 | 0.94 | 0.99 | 1.00 | 0.95 |
| | 0.25 | 0.47 | 0.72 | 1.00 | 0.95 | 0.90 | 0.98 | 1.00 | 0.93 |
| | 0.3 | 0.40 | 0.63 | 1.00 | 0.96 | 0.86 | 0.97 | 1.00 | 0.92 |
| | 0.35 | 0.34 | 0.54 | 1.00 | 0.97 | 0.79 | 0.97 | 1.00 | 0.90 |
| | 0.4 | 0.28 | 0.45 | 1.00 | 0.98 | 0.73 | 0.96 | 1.00 | 0.88 |
| | 0.45 | 0.24 | 0.38 | 1.00 | 0.99 | 0.66 | 0.95 | 1.00 | 0.87 |
| | 0.5 | 0.20 | 0.32 | 1.00 | 1.00 | 0.59 | 0.94 | 1.00 | 0.85 |
| | 0.55 | 0.16 | 0.26 | 1.00 | 1.00 | 0.53 | 0.92 | 1.00 | 0.83 |
| | 0.6 | 0.13 | 0.21 | 1.00 | 1.00 | 0.47 | 0.90 | 1.00 | 0.81 |
| | 0.65 | 0.10 | 0.16 | 1.00 | 1.00 | 0.39 | 0.87 | 1.00 | 0.79 |
| | 0.7 | 0.08 | 0.12 | 1.00 | 0.99 | 0.33 | 0.85 | 1.00 | 0.77 |
| | 0.75 | 0.06 | 0.10 | 1.00 | 0.98 | 0.27 | 0.82 | 1.00 | 0.75 |
| | 0.8 | 0.05 | 0.07 | 1.00 | 0.97 | 0.22 | 0.79 | 1.00 | 0.74 |
| | 0.85 | 0.04 | 0.06 | 1.00 | 0.96 | 0.18 | 0.76 | 1.00 | 0.72 |
| | 0.9 | 0.03 | 0.04 | 1.00 | 0.95 | 0.14 | 0.74 | 1.00 | 0.70 |
| | 0.95 | 0.02 | 0.03 | 1.00 | 0.93 | 0.11 | 0.71 | 1.00 | 0.68 |
| | 1 | 0.02 | 0.02 | 1.00 | 0.90 | 0.08 | 0.68 | 1.00 | 0.66 |

When the aperture radius $r_{sp}$ of the mechanical stop 102d is set to $0.7r_{spmax}$, the distribution of the entire system normalized transmittance T in the meridional cross sections of the axial light flux and the outermost off-axis light flux at the various coefficients α and β is shown in the following Tables 17 and 18, respectively.

TABLE 17

| | | | | | | | |
|---|---|---|---|---|---|---|---|
| 1031d | α | 0.4 | 0.7 | 0.26 | 0.3 | 0.45 | 0.3 |
| | β | 1 | 0.01 | 30 | 12 | 20 | 12 |
| 1032d | α | 0.4 | 0.7 | 0.7 | 0.7 | 0.7 | 0.3 |
| | β | 1 | 20 | 20 | 20 | 20 | 12 |
| $r_p$ | 0 | 1.00 | 1.00 | 1.00 | 1.00 | 1.00 | 1.00 |
| | 0.05 | 0.98 | 1.00 | 1.00 | 0.99 | 1.00 | 0.98 |
| | 0.1 | 0.97 | 1.00 | 1.00 | 0.98 | 1.00 | 0.96 |
| | 0.15 | 0.95 | 1.00 | 1.00 | 0.97 | 1.00 | 0.94 |
| | 0.2 | 0.93 | 1.00 | 0.99 | 0.95 | 1.00 | 0.90 |
| | 0.25 | 0.92 | 1.00 | 0.98 | 0.92 | 1.00 | 0.85 |
| | 0.3 | 0.90 | 1.00 | 0.96 | 0.89 | 1.00 | 0.78 |
| | 0.35 | 0.88 | 1.00 | 0.92 | 0.84 | 1.00 | 0.69 |
| | 0.4 | 0.86 | 1.00 | 0.82 | 0.77 | 0.99 | 0.57 |
| | 0.45 | 0.84 | 1.00 | 0.64 | 0.69 | 0.99 | 0.45 |
| | 0.5 | 0.82 | 1.00 | 0.46 | 0.61 | 0.98 | 0.35 |
| | 0.55 | 0.80 | 1.00 | 0.28 | 0.53 | 0.97 | 0.27 |
| | 0.6 | 0.78 | 1.00 | 0.15 | 0.46 | 0.95 | 0.19 |
| | 0.65 | 0.76 | 1.00 | 0.07 | 0.37 | 0.91 | 0.12 |
| | 0.7 | 0.74 | 1.00 | 0.03 | 0.30 | 0.84 | 0.08 |
| | 0.75 | 0.72 | 0.99 | 0.01 | 0.24 | 0.73 | 0.05 |
| | 0.8 | 0.70 | 0.99 | 0.01 | 0.18 | 0.60 | 0.03 |
| | 0.85 | 0.68 | 0.99 | 0.00 | 0.14 | 0.48 | 0.02 |
| | 0.9 | 0.66 | 0.98 | 0.00 | 0.10 | 0.34 | 0.01 |
| | 0.95 | 0.63 | 0.97 | 0.00 | 0.08 | 0.23 | 0.00 |
| | 1 | 0.61 | 0.95 | 0.00 | 0.05 | 0.15 | 0.00 |

TABLE 18

| | | | | | | | |
|---|---|---|---|---|---|---|---|
| 1031d | α | 0.4 | 0.7 | 0.26 | 0.3 | 0.45 | 0.3 |
| | β | 1 | 0.01 | 30 | 12 | 20 | 12 |
| 1032d | α | 0.4 | 0.7 | 0.7 | 0.7 | 0.7 | 0.3 |
| | β | 1 | 20 | 20 | 20 | 20 | 12 |
| $r_p$ | −1 | 0.67 | 0.00 | 0.00 | 0.00 | 0.00 | 0.00 |
| | −0.95 | 0.70 | 0.00 | 0.01 | 0.01 | 0.00 | 0.01 |
| | −0.9 | 0.73 | 0.01 | 0.01 | 0.01 | 0.00 | 0.01 |
| | −0.85 | 0.76 | 0.02 | 0.02 | 0.02 | 0.00 | 0.02 |
| | −0.8 | 0.80 | 0.04 | 0.05 | 0.05 | 0.01 | 0.04 |
| | −0.75 | 0.83 | 0.08 | 0.09 | 0.10 | 0.01 | 0.08 |
| | −0.7 | 0.86 | 0.15 | 0.17 | 0.18 | 0.01 | 0.15 |
| | −0.65 | 0.89 | 0.25 | 0.27 | 0.30 | 0.02 | 0.25 |
| | −0.6 | 0.90 | 0.39 | 0.44 | 0.47 | 0.04 | 0.40 |
| | −0.55 | 0.92 | 0.53 | 0.59 | 0.63 | 0.05 | 0.55 |
| | −0.5 | 0.93 | 0.70 | 0.78 | 0.82 | 0.08 | 0.72 |
| | −0.45 | 0.94 | 0.83 | 0.91 | 0.95 | 0.12 | 0.85 |
| | −0.4 | 0.95 | 0.90 | 0.98 | 1.00 | 0.17 | 0.92 |
| | −0.35 | 0.96 | 0.94 | 1.00 | 1.00 | 0.24 | 0.96 |
| | −0.3 | 0.97 | 0.96 | 0.97 | 0.96 | 0.34 | 0.98 |
| | −0.25 | 0.98 | 0.98 | 0.86 | 0.89 | 0.44 | 1.00 |
| | −0.2 | 0.99 | 0.98 | 0.65 | 0.79 | 0.56 | 1.00 |
| | −0.15 | 0.99 | 0.99 | 0.44 | 0.70 | 0.69 | 1.00 |
| | −0.1 | 1.00 | 0.99 | 0.25 | 0.61 | 0.83 | 0.98 |
| | −0.05 | 1.00 | 1.00 | 0.13 | 0.51 | 0.94 | 0.96 |
| | 0 | 1.00 | 1.00 | 0.06 | 0.41 | 0.97 | 0.92 |
| | 0.05 | 1.00 | 1.00 | 0.03 | 0.32 | 1.00 | 0.84 |
| | 0.1 | 1.00 | 1.00 | 0.01 | 0.25 | 0.97 | 0.71 |
| | 0.15 | 1.00 | 1.00 | 0.00 | 0.19 | 0.86 | 0.57 |
| | 0.2 | 0.99 | 1.00 | 0.00 | 0.14 | 0.75 | 0.44 |
| | 0.25 | 0.99 | 1.00 | 0.00 | 0.10 | 0.63 | 0.30 |
| | 0.3 | 0.98 | 1.00 | 0.00 | 0.08 | 0.51 | 0.20 |
| | 0.35 | 0.98 | 1.00 | 0.00 | 0.05 | 0.40 | 0.12 |
| | 0.4 | 0.97 | 1.00 | 0.00 | 0.04 | 0.30 | 0.07 |
| | 0.45 | 0.96 | 1.00 | 0.00 | 0.03 | 0.22 | 0.04 |
| | 0.5 | 0.95 | 1.00 | 0.00 | 0.02 | 0.16 | 0.02 |
| | 0.55 | 0.94 | 1.00 | 0.00 | 0.01 | 0.11 | 0.01 |
| | 0.6 | 0.93 | 1.00 | 0.00 | 0.01 | 0.08 | 0.01 |
| | 0.65 | 0.92 | 1.00 | 0.00 | 0.01 | 0.06 | 0.00 |
| | 0.7 | 0.90 | 1.00 | 0.00 | 0.00 | 0.04 | 0.00 |
| | 0.75 | 0.87 | 1.00 | 0.00 | 0.00 | 0.03 | 0.00 |
| | 0.8 | 0.84 | 1.00 | 0.00 | 0.00 | 0.02 | 0.00 |
| | 0.85 | 0.82 | 1.00 | 0.00 | 0.00 | 0.01 | 0.00 |
| | 0.9 | 0.79 | 1.00 | 0.00 | 0.00 | 0.01 | 0.00 |
| | 0.95 | 0.77 | 1.00 | 0.00 | 0.00 | 0.01 | 0.00 |

TABLE 18-continued

| | | | | | | | |
|---|---|---|---|---|---|---|---|
| 1031d | α | 0.4 | 0.7 | 0.26 | 0.3 | 0.45 | 0.3 |
| | β | 1 | 0.01 | 30 | 12 | 20 | 12 |
| 1032d | α | 0.4 | 0.7 | 0.7 | 0.7 | 0.7 | 0.3 |
| | β | 1 | 20 | 20 | 20 | 20 | 12 |
| | 1 | 0.74 | 1.00 | 0.00 | 0.00 | 0.00 | 0.00 |

Note that values of the coefficients α and β described in Tables 15 to 18 are examples, and the aspect of the embodiments is not limited thereto. The coefficients α and β can take various values in the image pickup apparatus 100d.

Next, Numerical Examples 1 to 4 corresponding to the above-mentioned Examples 1 to 4 will be described.

In each Numerical Example, i represents a surface number indicating the i-th surface from the object side, and ri represents a curvature radius (mm) of the i-th surface from the object side.

Further, di represents a surface interval (mm) on the optical axis between the i-th surface and the i+1-th surface from the object side, and ndi and vdi represent a refractive index and an Abbe number of an optical member between the i-th surface and the i+1-th surface, respectively.

The Abbe number vd is represented by the following expression:

$$vd = (Nd-1)/(NF-NC),$$

when refractive indices for the d-line (587.6 nm), the F-line (486.1 nm) and the C-line (656.3 nm) of the Fraunhofer line are represented by Nd, NF and NC, respectively.

Values of the focal length f, the F-number Fno, and the angle of view 2ω (degrees), which are shown in each Numerical Example, are values when focusing on an object at infinity.

Further, BF represents a back focus, and a distance on the optical axis from the final lens surface (the lens surface closest to the image side) to the paraxial image plane is expressed as an air-equivalent length. The total lens length represents a distance from the first surface to the image plane, and a symbol "*" is added after the surface number for an aspherical surface.

The aspherical shape is represented by the following expression (31), when X represents a displacement amount from the surface vertex in the optical axis direction, h represents a height from the optical axis in the direction perpendicular to the optical axis, R represents a paraxial curvature radius, k represents the conic constant, and A4 and A6 represent aspherical coefficients.

$$X = \frac{\left(\frac{h}{R}\right)^2}{1 + \sqrt{1-(1+k)\left(\frac{h}{R}\right)^2}} + A4 \cdot h^4 + A6 \cdot h^6 \quad (31)$$

In each Numerical Example, "e±Z" means "$10^{\pm Z}$", and an effective diameter of the stop surface corresponds to the maximum value $r_{spmax}$ of the aperture radius $r_{sp}$.

Numerical Example 1

| Unit mm | | | | | |
|---|---|---|---|---|---|
| Surface data | | | | | |
| Surface number | ri | di | ndi | vdi | Effective diameter |
| 1 | 62.721 | 21.86 | 1.43875 | 94.9 | 83.10 |
| 2 | −312.309 | 0.38 | | | 80.57 |
| 3 | 55.455 | 9.69 | 1.63858 | 55.2 | 63.34 |
| 4 | 258.552 | 2.14 | | | 61.21 |
| 5 | −1445.156 | 3.35 | 1.90525 | 35.0 | 61.20 |
| 6 | 101.890 | 2.30 | | | 54.38 |
| 7 | 39.791 | 4.79 | 1.80518 | 25.4 | 46.35 |
| 8 | 30.612 | 9.46 | | | 39.87 |
| 9 (Aperture) | Infinity | 1.50 | | | 37.52 |
| 10 | Infinity | 3.00 | 1.51633 | 64.1 | 36.60 |
| 11 | Infinity | 0.15 | | | 35.68 |
| 12 | 60.423 | 2.54 | 1.72916 | 54.7 | 35.94 |
| 13 | 230.996 | (Variable) | | | 35.85 |
| 14 | −1069.370 | 3.07 | 2.10420 | 17.0 | 35.61 |
| 15 | −89.758 | 1.72 | 1.74950 | 35.0 | 35.49 |
| 16 | 36.341 | (Variable) | | | 34.10 |
| 17 | −33.975 | 1.60 | 1.64769 | 33.8 | 42.58 |
| 18 | 93.253 | 16.29 | 1.72916 | 54.7 | 54.61 |
| 19 | −49.183 | 0.19 | | | 57.10 |
| 20 | 87.234 | 10.61 | 1.74100 | 52.6 | 63.62 |
| 21 | −214.304 | (Variable) | | | 63.39 |
| Image plane | Infinity | | | | |

| Various data | |
|---|---|
| Focal length | 133.05 |
| F-number | 2.06 |
| Angle of view | 9.24 |
| Image height | 21.64 |
| Total lens length | 170.39 |
| BF | 45.96 |
| d13 | 1.99 |
| d16 | 27.80 |
| d21 | 45.96 |

-continued

| Unit mm | |
|---|---|
| Incident pupil position | 70.15 |
| Exit pupil position | −256.09 |
| Front principal point position | 144.60 |
| Rear principal point position | −87.09 |

Lens unit data

| Unit | Start surface | Focal length | Lens constitution length | Front principal point position | Rear principal point position |
|---|---|---|---|---|---|
| 1 | 1 | 83.08 | 61.16 | 10.00 | −40.07 |
| 2 | 14 | −56.59 | 4.79 | 2.52 | 0.08 |
| 3 | 17 | 74.18 | 28.69 | 22.00 | 9.75 |

Single lens data

| Lens | Start surface | Focal length |
|---|---|---|
| 1 | 1 | 121.20 |
| 2 | 3 | 108.53 |
| 3 | 5 | −105.03 |
| 4 | 7 | −214.74 |
| 5 | 10 | 0.00 |
| 6 | 12 | 111.52 |
| 7 | 14 | 88.59 |
| 8 | 15 | −34.31 |
| 9 | 17 | −38.26 |
| 10 | 18 | 46.40 |
| 11 | 20 | 84.94 |

Numerical Example 2

| Unit mm | | | | |
|---|---|---|---|---|
| Surface Data | | | | |
| Surface number | ri | di | ndi | vdi | Effective diameter |
|---|---|---|---|---|---|
| 1 | 142.039 | 16.50 | 1.43875 | 94.9 | 99.96 |
| 2 | −291.943 | 0.10 | | | 99.24 |
| 3 | 113.394 | 12.00 | 1.43875 | 94.9 | 92.23 |
| 4 | 2251.000 | 3.50 | | | 90.60 |
| 5 | −493.629 | 3.00 | 1.78800 | 47.4 | 89.70 |
| 6 | 188.579 | 22.00 | | | 85.89 |
| 7 | Infinity | 3.00 | 1.51633 | 64.1 | 80.54 |
| 8 | 7704.935 | 38.00 | | | 79.91 |
| 9 | 74.095 | 11.20 | 1.45650 | 90.3 | 65.86 |
| 10 | 574.708 | 2.00 | | | 63.62 |
| 11 | 47.590 | 2.60 | 1.75501 | 51.2 | 56.26 |
| 12 | 40.574 | 32.80 | | | 52.98 |
| 13 (Aperture) | Infinity | (Variable) | | | 39.97 |
| 14 | 212.437 | 4.00 | 1.78880 | 28.4 | 38.90 |
| 15 | −155.217 | 1.60 | 1.75501 | 51.2 | 38.14 |
| 16 | 60.802 | (Variable) | | | 35.91 |
| Image plane | Infinity | | | | |

Various data

| Focal length | 399.84 |
|---|---|
| F-number | 4.00 |
| Angle of view | 3.10 |
| Image height | 21.64 |
| Total lens length | 298.46 |
| BF | 145.16 |
| d13 | 1.00 |
| d16 | 145.16 |
| Incident pupil position | 313.91 |
| Exit pupil position | −3.95 |
| Front principal point position | −358.41 |
| Rear principal point position | −254.68 |

-continued

Unit mm

Lens unit data

| Unit | Start surface | Focal length | Lens constitution length | Front principal point position | Rear principal point position |
|---|---|---|---|---|---|
| 1 | 1 | 181.84 | 146.70 | 30.02 | −110.84 |
| 2 | 14 | −119.89 | 5.60 | 4.63 | 1.42 |

Single lens data

| Lens | Start surface | Focal length |
|---|---|---|
| 1 | 1 | 220.33 |
| 2 | 3 | 271.69 |
| 3 | 5 | −172.83 |
| 4 | 7 | −14922.50 |
| 5 | 9 | 185.04 |
| 6 | 11 | −433.68 |
| 7 | 14 | 114.25 |
| 8 | 15 | −57.68 |

Numerical Example 3

Unit mm

Surface Data

| Surface number | ri | di | ndi | vdi | Effective diameter |
|---|---|---|---|---|---|
| 1 | Infinity | 2.00 | 1.51633 | 64.1 | 31.03 |
| 2 | Infinity | 1.25 | | | 29.93 |
| 3 | 29.889 | 7.50 | 1.88300 | 40.8 | 26.16 |
| 4 | −374.377 | 2.00 | 1.67270 | 32.2 | 22.17 |
| 5 | 36.994 | 5.25 | | | 18.54 |
| 6 (Aperture) | Infinity | 4.00 | | | 15.31 |
| 7 | −30.069 | 0.90 | 1.69895 | 30.1 | 14.35 |
| 8 | 18.311 | 3.60 | 1.88300 | 40.8 | 17.11 |
| 9 | 190.435 | 1.50 | | | 17.99 |
| 10 | 47.549 | 5.60 | 1.77250 | 49.5 | 20.95 |
| 11* | −43.197 | (Variable) | | | 22.11 |
| 12 | −76.796 | 2.00 | 1.58144 | 40.9 | 23.53 |
| 13 | −110.979 | 10.70 | | | 24.27 |
| 14 | −15.782 | 1.00 | 1.53172 | 48.8 | 26.05 |
| 15 | −229.999 | 0.15 | | | 33.89 |
| 16 | −2585.005 | 5.90 | 1.91082 | 35.3 | 35.23 |
| 17 | −35.964 | (Variable) | | | 36.09 |
| Image plane | Infinity | | | | |

Aspherical surface data

11th surface
K = 0.00000e+000    A4 = 1.31849e−005    A6 = −7.72465e−010

Various data

| | |
|---|---|
| Focal length | 49.00 |
| F-number | 2.50 |
| Angle of view | 23.82 |
| Image height | 21.64 |
| Total lens length | 68.15 |
| BF | 11.00 |
| d11 | 3.80 |
| d17 | 11.00 |
| Incident pupil position | 16.74 |
| Exit pupil position | −38.01 |
| Front principal point position | 16.75 |
| Rear principal point position | −38.00 |

-continued

| Unit mm | | | | | |
|---|---|---|---|---|---|
| Lens unit data | | | | | |
| Unit | Start surface | Focal length | Lens constitution length | Front principal point position | Rear principal point position |
| 1 | 1 | 39.81 | 33.60 | 18.05 | −13.67 |
| 2 | 12 | −186.10 | 19.75 | −12.55 | −31.94 |
| Single lens data | | | | | |
| Lens | | Start surface | | Focal length | |
| 1 | | 1 | | 0.00 | |
| 2 | | 3 | | 31.62 | |
| 3 | | 4 | | −49.95 | |
| 4 | | 7 | | −16.16 | |
| 5 | | 8 | | 22.72 | |
| 6 | | 10 | | 30.11 | |
| 7 | | 12 | | −438.23 | |
| 8 | | 14 | | −31.92 | |
| 9 | | 16 | | 40.00 | |

Numerical Example 4

| Unit mm | | | | | |
|---|---|---|---|---|---|
| Surface data | | | | | |
| Surface number | ri | di | ndi | νdi | Effective diameter |
| 1 | 29.889 | 7.50 | 1.88300 | 40.8 | 26.49 |
| 2 | −374.377 | 0.30 | 1.51633 | 64.1 | 22.53 |
| 3 | −374.377 | 2.00 | 1.67270 | 32.2 | 22.15 |
| 4 | 36.994 | 5.25 | | | 18.49 |
| 5 (Aperture) | Infinity | 4.00 | | | 15.12 |
| 6 | −30.069 | 0.90 | 1.69895 | 30.1 | 14.15 |
| 7 | 18.311 | 0.30 | 1.51633 | 64.1 | 17.02 |
| 8 | 18.311 | 3.60 | 1.88300 | 40.8 | 17.50 |
| 9 | 190.435 | 1.50 | | | 18.31 |
| 10 | 47.549 | 5.60 | 1.77250 | 49.5 | 21.29 |
| 11* | −43.197 | (Variable) | | | 22.39 |
| 12 | −76.796 | 2.00 | 1.58144 | 40.9 | 23.75 |
| 13 | −110.979 | 10.70 | | | 24.47 |
| 14 | −15.782 | 1.00 | 1.53172 | 48.8 | 26.16 |
| 15 | −229.999 | 0.15 | | | 34.06 |
| 16 | −2585.005 | 5.90 | 1.91082 | 35.3 | 35.40 |
| 17 | −35.964 | (Variable) | | | 36.23 |
| Image plane | Infinity | | | | |
| Aspherical surface data | | | | | |

11th surface
K = 0.00000e+000   A4 = 1.31849e−005   A6 = −7.72465e−010

| Various data | |
|---|---|
| Focal length | 48.82 |
| F-number | 2.50 |
| Angle of view | 23.90 |
| Image height | 21.64 |
| Total lens length | 65.03 |
| BF | 10.53 |
| d11 | 3.80 |
| d17 | 10.53 |
| Incident pupil position | 14.58 |
| Exit pupil position | −38.44 |
| Front principal point position | 14.73 |
| Rear principal point position | −38.30 |

-continued

Unit mm

Lens unit data

| Unit | Start surface | Focal length | Lens constitution length | Front principal point position | Rear principal point position |
|---|---|---|---|---|---|
| 1 | 1 | 39.75 | 30.95 | 16.09 | −13.93 |
| 2 | 12 | −186.10 | 19.75 | −12.55 | −31.94 |

Single lens data

| Lens | Start surface | Focal length |
|---|---|---|
| 1 | 1 | 31.62 |
| 2 | 2 | 2657272.46 |
| 3 | 3 | −49.95 |
| 4 | 6 | −16.16 |
| 5 | 7 | 6356.87 |
| 6 | 8 | 22.72 |
| 7 | 10 | 30.11 |
| 8 | 12 | −438.23 |
| 9 | 14 | −31.92 |
| 10 | 16 | 40.00 |

For each Numerical Example, numerical values corresponding to the inequalities (27) to (30) are shown in the following Table 19. The numerical values shown in the Table 19 are all values obtained when focusing on an object at infinity.

TABLE 19

| Conditional expression | Numerical Example 1 | Numerical Example 2 | Numerical Example 3 | Numerical Example 4 (1032d) |
|---|---|---|---|---|
| (27): $d_1/L$ | 0.00 | 0.20 | 0.25 | 0.07 |
| (28): $d_2/L$ | 0.02 | 0.295 | 0.25 | 0.08 |
| (29): $w_{10}/w_0$ | 1.00 | 0.82 | 0.80 | 0.80 |
| (30): $(w_{lap}/w_{b0})/(w_{10}/w_0)$ | 0.97 | 0.99 | 0.65 | 0.84 |

With respect to the Numerical Example 4, numerical values corresponding to the inequalities (27) to (30) are shown for the second distribution variable element 1032d.

When two or more distribution variable elements are provided as in the Numerical Example 4, it is sufficient that the inequalities (27) to (30) are satisfied for at least one distribution variable element.

Note that the inequalities (27) to (30) are also satisfied for the first distribution variable element 1031d in the Numerical Example 4.

The transmittance distribution and the imaging optical system shown in each of the Examples 1 to 4 are not limited to the above-mentioned combination.

For example, instead of the distribution variable element having the transmittance distribution expressed by the expression (11) in the Example 1, a distribution variable element having the transmittance distribution expressed by the expression (17) may be used.

Further, instead of the distribution variable element having the transmittance distribution expressed by the expression (17) in the Example 2, a distribution variable element having the transmittance distribution represented by the expression (11) may be used.

Furthermore, instead of one of the two distribution variable elements having the transmittance distribution expressed by the expression (17) in the Example 4, a distribution variable element having the transmittance distribution expressed by the expression (11) may be used.

In addition, a distribution variable element for realizing a transmittance distribution different from the transmittance distribution expressed by the expression (11) or the expression (17) may be used, an imaging optical system having a retrofocus type configuration may be used, and a zoom lens or a macro lens may be used as the imaging optical system.

Although the exemplary embodiments have been described above, the disclosure is not limited to these embodiments, and various modifications and variations can be made within the scope of the gist thereof.

According to the aspect of the embodiments, it is possible to provide the optical apparatus capable of sufficiently adjusting the sharpness of the outline of the blur even when the aperture diameter of the stop is largely changed.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-199390, filed Dec. 1, 2020, which is hereby incorporated by reference herein in its entirety.

What is claimed is:

1. An apparatus comprising:
   a system including an element capable of changing a radius at which a normalized transmittance becomes 0.25 by 20% or more of a maximum effective radius, and a stop capable of changing an aperture radius; and
   a control unit configured to control a transmittance distribution of the element and the aperture radius based on a radius and a transmittance distribution of an exit pupil of the system.

2. The apparatus according to claim 1, wherein the control unit determines a third value for specifying the transmittance distribution of the element based on a first value for specifying the radius of the exit pupil and a second value for specifying the transmittance distribution of the exit pupil.

3. The apparatus according to claim 2, wherein the control unit limits a range of the second value or the third value based on the first value.

4. The apparatus according to claim 3, further comprising a display unit for displaying the limited range.

5. The apparatus according to claim 1, wherein a following inequality is satisfied when the radius of the exit pupil of the system is any of $r_{pamax}$ and $0.7r_{pamax}$:

$$0.002 \leq T_c/T_m \leq 0.500$$

where $T_m$ and $T_c$ represent a maximum value and a value when the element has a predetermined transmittance distribution of a transmittance at a position through which a marginal ray of an axial light flux passes of the element, respectively, and $r_{pamax}$ represents a maximum value of the radius of the exit pupil of the system.

6. The apparatus according to claim 1, wherein a following inequality is satisfied:

$$0.00 \leq d_1/L \leq 0.35$$

where L represents a total length of the system, and $d_1$ represents a distance in an axis direction between an intersection of a center of an outermost off-axis light flux and an optical axis, and the element in a meridional cross section.

7. The apparatus according to claim 1, wherein a following inequality is satisfied:

$$0.00 \leq d_2/L \leq 0.35$$

where L represents a total length of the system, and $d_2$ represents a distance in an axis direction between the element and the stop.

8. The apparatus according to claim 1, wherein a following inequality is satisfied:

$$0.7 \leq w_{10}/w_0 \leq 1.3$$

where $w_{10}$ and $w_0$ represent a light flux width of an outermost off-axis light flux and an axial light flux when they are incident on the system in a meridional cross section when the aperture radius is maximum, respectively.

9. The apparatus according to claim 1, wherein a following inequality is satisfied:

$$0.6 \leq (w_{lap}/w_{b0})/(w_{10}/w_0) \leq 1.3$$

where $w_{10}$ and $w_0$ represent a light flux width of an outermost off-axis light flux and an axial light flux when they are incident on the system, respectively, $w_{b0}$ represents the light flux width in a direction perpendicular to an axis of the axial light flux on the element, and $w_{lap}$ represents a width in the direction perpendicular to the axis of a portion in which the outermost off-axis light flux and the axial light flux overlap each other on the element, in a meridional cross section when the aperture radius is maximum.

10. The apparatus according to claim 1, wherein a following inequality is satisfied when a normalized radius of the exit pupil of the system is any of 1 and 0.7:

$$-6.0 \leq D'(r_p) \leq 1.0$$

where $r_p$ and $D(r_p)$ represent the normalized radius and a normalized transmittance of the exit pupil of the system, respectively.

11. The apparatus according to claim 10, wherein a following inequality is satisfied when D(1)<0.1 and the normalized radius is any of 1 and 0.7:

$$-0.80 \leq \text{ave}(D'(r_p))[0.9,1] \leq 0.00.$$

12. The apparatus according to claim 1, wherein a following inequality is satisfied when a normalized radius of the exit pupil of the system is any of 1 and 0.7:

$$-1.00 \leq \text{ave}(D'(r_p))[0,0.2] \leq 0.10$$

where $r_p$ and $D(r_p)$ represent the normalized radius and a normalized transmittance of the exit pupil of the system, respectively.

13. The apparatus according to claim 1, wherein a following inequality is satisfied:

$$0.3^p < T_{min}/T_{max} < 1.0$$

where $T_{max}$ and $T_{min}$ represent maximum and minimum values of a transmittance on an axis of the exit pupil of the system during changing the transmittance distribution of the element when the radius of the exit pupil is maximum, respectively, p represents the number of the element included in the system.

14. The apparatus according to claim 1,
wherein the element is provided with a plurality of electrodes arrayed within an effective diameter, and
wherein an axial light flux passes between boundaries of the plurality of electrodes when the transmittance distribution of the element and the aperture radius are set such that a transmittance of the exit pupil for the axial light flux of the system becomes maximum.

15. The apparatus according to claim 1, wherein the element is provided with a single electrode in a direction perpendicular to an axis within an effective diameter.

16. An image pickup apparatus comprising:
an apparatus including:
a system including an element capable of changing a radius at which a normalized transmittance becomes 0.25 by 20% or more of a maximum effective radius, and a stop capable of changing an aperture radius based on a radius and a transmittance distribution of an exit pupil of the system; and
a control unit configured to control a transmittance distribution of the element and the aperture radius; and
an image pickup element configured to receive light of an image formed by the apparatus.

17. The image pickup apparatus according to claim 16, wherein a following inequality is satisfied when the radius of the exit pupil of the system is any of $r_{pamax}$ and $0.7r_{pamax}$:

$$0.002 \leq T_c/T_m \leq 0.500$$

where $T_m$ and $T_c$ represent a maximum value and a value when the element has a predetermined transmittance distribution of a transmittance at a position through which a marginal ray of an axial light flux passes of the element, respectively, and $r_{pamax}$ represents a maximum value of the radius of the exit pupil of the system.

18. The image pickup apparatus according to claim 16, wherein a following inequality is satisfied:

$$0.00 \leq d_1/L \leq 0.35$$

where L represents a total length of the system, and $d_1$ represents a distance in an axis direction between an intersection of a center of an outermost off-axis light flux and an axis, and the element in a meridional cross section.

19. The image pickup apparatus according to claim 16, wherein a following inequality is satisfied:

$$0.00 \leq d_2/L \leq 0.35$$

where L represents a total length of the system, and $d_2$ represents a distance in an axis direction between the element and the stop.

* * * * *